(12) United States Patent
Clark et al.

(10) Patent No.: US 11,043,852 B2
(45) Date of Patent: Jun. 22, 2021

(54) METHODS AND APPARATUSES USING DEVICE COMPONENTS POWERED BY WIRELESS ENERGY

(71) Applicants: Brendan Edward Clark, Rocky River, OH (US); Ronald Charles Krosky, Cockeysville, MD (US)

(72) Inventors: Brendan Edward Clark, Rocky River, OH (US); Ronald Charles Krosky, Cockeysville, MD (US)

(*) Notice: Subject to any disclaimer, the term of this patent is extended or adjusted under 35 U.S.C. 154(b) by 11 days.

(21) Appl. No.: 16/266,038

(22) Filed: Feb. 2, 2019

(65) Prior Publication Data
US 2019/0165617 A1 May 30, 2019

Related U.S. Application Data

(63) Continuation of application No. 15/632,365, filed on Jun. 25, 2017, now Pat. No. 10,205,350, which is a continuation of application No. 12/752,081, filed on Mar. 31, 2010, now Pat. No. 9,692,485.

(60) Provisional application No. 61/165,486, filed on Mar. 31, 2009.

(51) Int. Cl.
| | |
|---|---|
| *H02J 50/40* | (2016.01) |
| *H04B 5/00* | (2006.01) |
| *H02J 50/80* | (2016.01) |
| *H02J 50/10* | (2016.01) |
| *G05B 15/02* | (2006.01) |
| *H02J 7/02* | (2016.01) |

(52) U.S. Cl.
CPC .............. *H02J 50/40* (2016.02); *G05B 15/02* (2013.01); *H02J 7/025* (2013.01); *H02J 50/10* (2016.02); *H02J 50/80* (2016.02); *H04B 5/00* (2013.01); *H04B 5/0037* (2013.01); *H04B 5/0075* (2013.01); *H02J 2207/10* (2020.01)

(58) Field of Classification Search
CPC ... H20J 50/00; H04B 5/00; H02J 50/00; H02J 50/40
USPC .......................................................... 307/104
See application file for complete search history.

(56) References Cited

U.S. PATENT DOCUMENTS

| | | | |
|---|---|---|---|
| 2,748,266 A | 5/1956 | Boyd | |
| 5,122,959 A * | 6/1992 | Nathanson | G08G 1/202 340/993 |
| 6,004,002 A | 12/1999 | Giannone | |
| 6,172,608 B1 | 1/2001 | Cole | |

(Continued)

FOREIGN PATENT DOCUMENTS

WO    WO03105311    12/2003

OTHER PUBLICATIONS

Plasma globe—Wikipedia, the free encyclopedia, http://en.wikipedia.org/wiki/Plasma_globe, accessed on Feb. 13, 2011, 3 pages.

(Continued)

*Primary Examiner* — Adi Amrany

(57) ABSTRACT

Systems, methods, and other embodiments associated with wireless energy are described. In one embodiment, a method can comprise collecting an energy that is transmitted wirelessly to produce a collected energy. The method can also comprise supplying the collected energy to a device. Individual components within an electronic device can be physically decoupled from others, sending and receiving energy and data wirelessly. Such components can be sealed against air or fluid.

20 Claims, 23 Drawing Sheets

(56) References Cited

U.S. PATENT DOCUMENTS

| | | | |
|---|---|---|---|
| 6,272,073 B1* | 8/2001 | Doucette | H04B 11/00 |
| | | | 134/127 |
| 6,462,432 B1 | 10/2002 | Seelig | |
| 6,856,819 B2 | 2/2005 | Itoh | |
| 6,985,713 B2 | 1/2006 | Lehr | |
| 7,164,255 B2 | 1/2007 | Hui | |
| 7,414,389 B2 | 8/2008 | Nguyen | |
| 7,415,623 B2 | 8/2008 | Rapps | |
| 7,462,951 B1 | 12/2008 | Baarman | |
| 7,522,878 B2 | 4/2009 | Baarman | |
| 7,764,235 B2 | 7/2010 | Matsunaga | |
| 7,948,208 B2 | 5/2011 | Partovi | |
| 8,193,764 B2 | 6/2012 | Jakubowski | |
| 8,487,478 B2 | 7/2013 | Kirby | |
| 8,716,814 B2 | 5/2014 | Yamazaki | |
| 2004/0150934 A1 | 8/2004 | Baarman | |
| 2005/0031147 A1* | 2/2005 | Viala | H04R 9/00 |
| | | | 381/334 |
| 2005/0068019 A1 | 3/2005 | Nakamura | |
| 2005/0127869 A1 | 6/2005 | Calhoon | |
| 2005/0149291 A1* | 7/2005 | Watson | B63C 11/32 |
| | | | 702/183 |
| 2006/0113955 A1 | 6/2006 | Nunally | |
| 2006/0238365 A1 | 10/2006 | Vecchione | |
| 2006/0279284 A1 | 12/2006 | Vaughan | |
| 2006/0284593 A1 | 12/2006 | Nagy | |
| 2007/0178945 A1 | 8/2007 | Cook | |
| 2007/0202931 A1 | 8/2007 | Lee | |
| 2007/0279002 A1 | 12/2007 | Partovi | |
| 2007/0296548 A1 | 12/2007 | Hall | |
| 2008/0093454 A1 | 4/2008 | Yamazaki | |
| 2008/0106469 A1 | 5/2008 | Kikkawa | |
| 2008/0254841 A1 | 10/2008 | Miyata | |
| 2008/0278264 A1 | 11/2008 | Karalis | |
| 2009/0009990 A1* | 1/2009 | Tseng | A43B 3/0005 |
| | | | 362/158 |
| 2009/0021213 A1 | 1/2009 | Johnson | |
| 2009/0075704 A1 | 3/2009 | Wang | |
| 2009/0134712 A1 | 5/2009 | Cook | |
| 2009/0222158 A1 | 9/2009 | Kubota | |
| 2009/0243396 A1 | 10/2009 | Randall | |
| 2009/0243397 A1 | 10/2009 | Cook | |
| 2009/0278493 A1 | 11/2009 | Alden | |
| 2009/0308933 A1 | 12/2009 | Osada | |
| 2009/0315512 A1 | 12/2009 | Ichikawa | |
| 2010/0022204 A1 | 1/2010 | Rofougaran | |
| 2010/0034238 A1 | 2/2010 | Bennett | |
| 2010/0127660 A1 | 5/2010 | Cook | |
| 2010/0145885 A1 | 6/2010 | Graziano | |
| 2010/0181841 A1 | 7/2010 | Azancot | |
| 2010/0277120 A1 | 11/2010 | Cook | |
| 2011/0127845 A1 | 6/2011 | Walley | |
| 2011/0304216 A1 | 12/2011 | Baarman | |

OTHER PUBLICATIONS

TI to demonstrate industry's first contactless charging evaluation kit at CES, http://newscenter.ti.com/Blogs/newsroom/archive/2010/01/OS/ti-to-demonstrate-industry-s-first-contactless-charging-evaluation-kit-at-ces-303264.aspx, accessed on Mar. 30, 2010, 2 pages.

Electric power—Wikipedia, the free encyclopedia, http://en.wikipedia.org/wiki/Electrical_power, accessed on Mar. 31, 2010, 3 pages.
Electric potential energy—Wikipedia, the free encyclopedia, http://en.wikipedia.org/wiki/Electrical_energy, accessed on Mar. 31, 2010, 4 pages.
Wireless energy transfer—Wikipedia, the free encyclopedia, http://en.wikipedia.org/wiki/Wireless_energy_transfer, accessed on Mar. 31, 2010, 15 pages.
Powermat USA | Powermat Product Line, http://www.powermat.com/us/products/, Powermat USA, LLC, accessed on Mar. 31, 2010.
Duracell myGrid | Charging Made Simple, http://www.duracell.com/en-US/category/mygrid.jspx, Procter & Gamble, accessed on Mar. 31, 2010, 1 page.
ECoupled Wireless Power Technology | What Is eCoupled Technology? | Fulton Innovation, http://www.ecoupled.com/technologyMain.html, Fulton Innovation, Inc., accessed on Mar. 31, 2010, 2 pages.
Powerharvesters Recievers | Powercast Corporation, http://www.powercastco.com/products/powerharvester-receivers!, Powercast Corporation, accessed on Mar. 31, 2010, 2 pages.
Powerbeam—wireless power, wireless electricity, wireless energy, http://www.powerbeaminc.com/how.php, powerbeam.com, accessed on Mar. 31, 2010, 1 page.
WiTricity Corp.—Basics of WiTricity Technology, http://www.witricity.com/pages/technology.html, WiTricity Corporation, accessed on Mar. 31, 2010, 1 page.
Sharp, http://www.friendsofcrc.ca/Projects/SHARP/sharp.html, Friends of CRC, Page created on Jun. 25, 1996 by Cynthia Boyko, Last updated on Feb. 6, 2001 by Stu McCormick, 5 pages.
Goodbye Wires . . . , www.mit.edu/-soljacic/MIT WiTricity_Press_Release.pdf, Franklin Hadley, accessed on Mar. 31, 2010, 3 pages.
Electric power transmission—Wikipedia, the free encyclopedia, http://en.wikipedia.org/wiki/Electric_power_transmission, accessed on Mar. 31, 2010, 15 pages.
WiTricity—Wikipedia, the free encyclopedia, http://en.wikipedia.org/wiki/WiTricity, accessed on Mar. 31, 2010, 4 pages.
Wireless Power Transfer via Strongly Coupled Magnetic Resonances, http://www.sciencemag.org/cgi/content/abstract/317 /5834/83, Ku rs, et al., webpage states Originally published in Science Express on Jun. 7, 2007 Science Jul. 6, 2007: vol. 317. No. 5834, pp. 83-86, accessed on Mar. 31, 2010, 1 page.
Wireless Power Transfer via Strongly Coupled Magnetic Resonances, http://www.sciencemag.org/cgi/content/full/ sci; 1143254/DC1, Ku rs, et al., webpage states Science Jul. 6, 2007, accessed on Mar. 31, 2010.
Wireless Electricity is Here (Seriously) | Fast Company, http://www.fastcompany.com/magazine/132/brilliant.html, Paul Hochman, Feb. 1, 2009, accessed on Mar. 31, 2010, 3 pages.
Photonics and Modern Electro-Magnetics Group: Wireless Power Transfer, http://www.mit.edu/-soljacic/wireless_power.html, accessed on Mar. 31, 2010, 16 pages.
Efficient wireless non-radiative mid-range energy transfer, http://arxiv.org/ftp/physics/papers/0611/0611063.pdf, Karalis, et al., accessed on Mar. 31, 2010, 19 pages.
Onizuka et al, "Chip-to-Chip Inductive Wireless Power Transmission System for SiP Applications", 2006, IEEE 2006 Custom Integrated Circuits Conference, pp. 575-578.

* cited by examiner

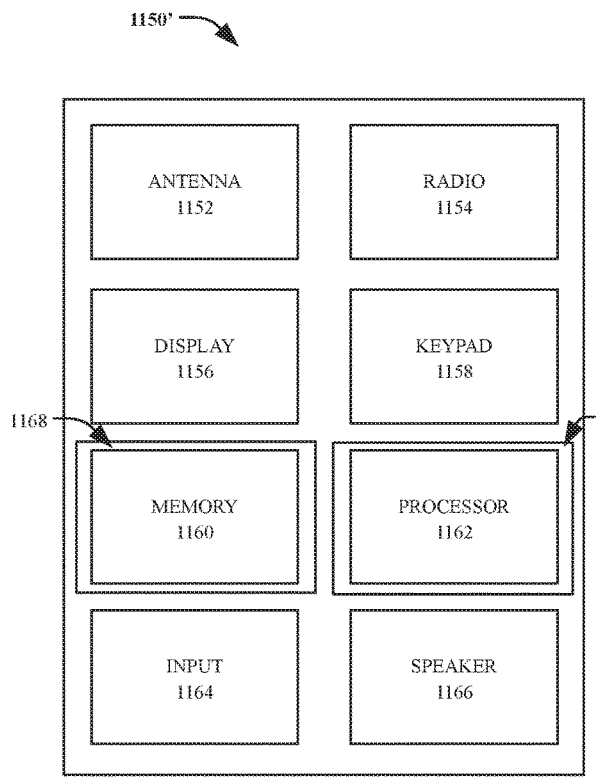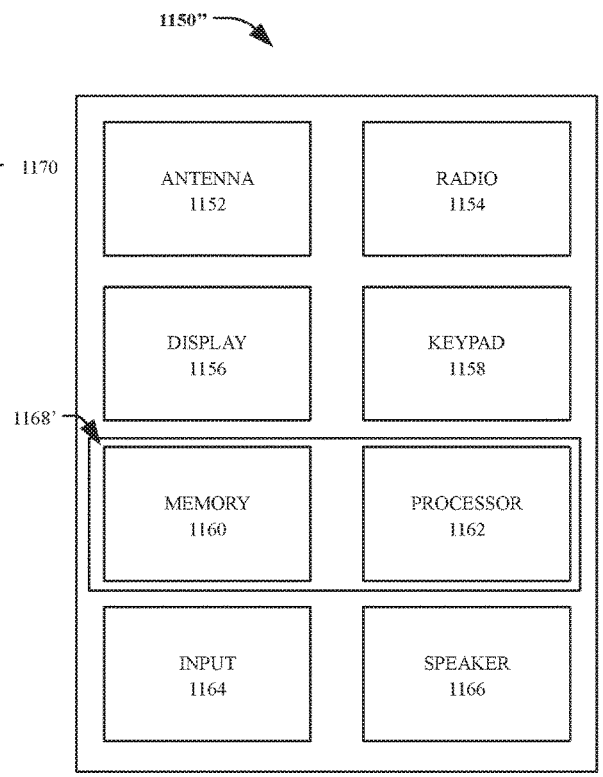
FIG. 11C
FIG. 11D

METHODS AND APPARATUSES USING DEVICE COMPONENTS POWERED BY WIRELESS ENERGY

CROSS REFERENCE TO RELATED APPLICATIONS

This continuation in part claims priority to and the benefit of U.S. nonprovisional patent application Ser. No. 15/632,365 filed on Jun. 25, 2017. U.S. nonprovisional patent application Ser. No. 12/752,081 (now U.S. Pat. No. 9,692,485) filed on Mar. 31, 2010, and U.S. provisional application Ser. No. 61/165,486 filed on Mar. 31, 2009, all of which are hereby wholly incorporated by reference.

BACKGROUND

An electronic device can use an energy to function. The energy can be used to perform various functions. Example functions can include powering a screen, running a processor, retaining information in memory, and others. Before being used to perform functions, energy can be retained in a battery and used when appropriate. In one embodiment, the energy is a wireless energy.

SUMMARY

In an embodiment, a system comprises an electronic device, a memory of the electronic device, wherein the memory is configured to receive wireless energy that powers the memory, wherein the memory is configured to send and receive wireless data, a processor of the electronic device, wherein the processor is configured to receive wireless energy that powers the processor, wherein the processor is configured to send and receive wireless data, and a fluid-resistant enclosure at least one of the memory and the processor. The memory and the processor interact by sending and receiving wireless data.

In embodiments, a method comprises powering operation of a memory component of a device using a first wirelessly collected energy, powering operation of a processor component of the device by a second wirelessly collected energy, and communicating data wirelessly between the memory component and the processor component. At least one of the memory component and the processor component are enclosed by a hermetic seal of the device.

These aspects are not intended to be limiting but only provide concise examples of some aspects herein, and further aspects will be appreciated on review of the disclosures of the Detailed Description.

BRIEF DESCRIPTION OF THE FIGURES

The accompanying drawings, which are incorporated in and constitute a part of the detailed description, illustrate various example systems, methods, and other example embodiments of various innovative aspects. These drawings include.

Figure 1:
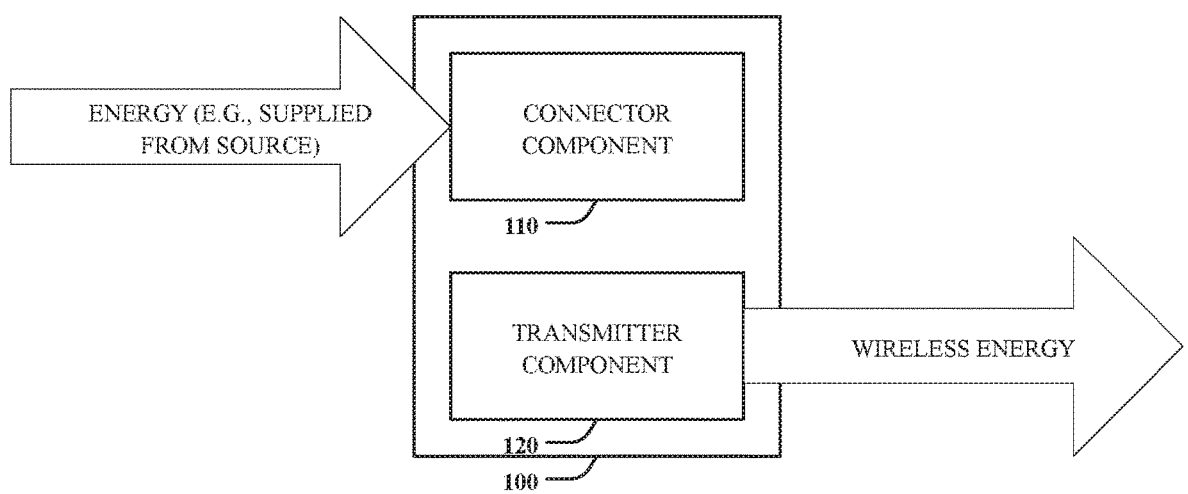
FIG. 1 that illustrates one embodiment of a system where energy is supplied to a wireless energy emitter, FIG. 2 that illustrates one embodiment of a system where a wireless energy emitter checks for a change condition, FIG. 3 that illustrates one embodiment of a system where a wireless energy receiver and connector component supply a device with energy, FIG. 4 that illustrates one embodiment of a system where a wireless energy receiver and connector supply a device with energy pursuant to permission controls, FIG. 5 that illustrates one embodiment of a system where wireless energy is transmitted from a transmitter and received by a receiver, FIG. 6 that illustrates one embodiment of a system where a transmitter transmits wireless energy to a receiver in a device, FIG. 7 that illustrates one embodiment of a system where a plurality of transmitters transmit wireless energy to a plurality of receivers, FIG. 8 that illustrates one embodiment of a system where a device both receives and transmits wireless power, FIG. 9 that illustrates one embodiment of a system where a wireless energy receiver powers an outlet or socket that powers a device using a plug compatible with such, FIG. 10 that illustrates one embodiment of a system where a wireless energy emitter receives energy from a socket or outlet, and emits energy for reception by a wireless energy receiver configured to connect to a device to power the device, FIG. 11A that illustrates one embodiment of a device that is constructed using wiring and physical connections between internal components, FIG. 11B that illustrates one embodiment of a device that is constructed without the use of wiring and physical connections between internal components, FIG. 11C that illustrates one embodiment of a device without the use of wiring and physical connections between internal components having a fluid-resistant enclosure, FIG. 11D that illustrates another embodiment of a device without the use of wiring and physical connections between internal components having a fluid-resistant enclosure, FIG. 12 that illustrates one embodiment of a device receiving both data and power wirelessly, FIG. 13 that illustrates one embodiment of a method for causing components to be supplied with wireless power, FIG. 14 that illustrates one embodiment of a method for causing rule-based control of transmitted energy and data, FIG. 15 that illustrates one embodiment of a method for powering an operation based on characteristics of the operation, FIG. 16 that illustrates one embodiment of a method for causing rule-based control of wireless electricity, FIG. 17 that illustrates one embodiment of a method for causing the collection of emitted energy, FIG. 18 that illustrates one embodiment of a method for causing the use of multiple wireless power techniques, FIG. 19 that illustrates re-transmission of energy received wirelessly, FIG. 20 that illustrates a method for supplying energy to a device, FIG. 21 that illustrates one embodiment of an example system that can be used in practice of at least one innovative aspect disclosed herein, and FIG. 22 that illustrates one embodiment of an example system that can be used in practice of at least one innovative aspect disclosed herein.

It will be appreciated that illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. These elements and other variations are considered to be embraced by the general theme of the figures, and it is understood that the drawings are intended to convey the spirit of certain features related to this application, and are by no means regarded as exhaustive or fully inclusive in their representations.

The terms 'may' and 'can' are used to indicate a permitted feature, or alternative embodiments, depending on the context of the description of the feature or embodiments. In one example, a sentence states 'A can be AA' or 'A may be AA'. Thus, in the former case, in one embodiment A is AA, and in another embodiment A is not AA. In the latter case, A may be selected to be AA, or A may be selected not to be AA. However, this is an example of A, and A should not be construed as only being AA. In either case, however, the alternative or permitted embodiments in the written description are not to be construed as injecting ambiguity into the appended claims. Where claim 'x' recites A is AA, for instance, then A is not to be construed as being other than AA for purposes of claim x. This is construction is so despite any permitted or alternative features and embodiments described in the written description.

DETAILED DESCRIPTION

Described herein are example systems, methods, and other embodiments associated with uses of wireless energy. A system can employ wireless energy, and techniques can be employed to deliver wireless energy to powered devices. A device can have equipment to enable use of wireless energy built in. Alternatively, other or supplemental equipment can be employed to enable or retrofit devices for wireless power. Wireless energy equipment can include adapters, outlets, base stations, et cetera.

An example system can be a device enabled to employ energy received wirelessly. This energy can provide for uses such as device operation, to recharge stores, or to provide to other devices or components, and others. The device can be enabled to receive energy via integrated components, add-on or plug-in components, external components independent of the device and/or others. In some embodiments, a wireless outlet, socket or plug can be provided that allows device energy supplies to operate as if they were connected via a wired energy supply.

The use of wireless energy enables a variety of embodiments of associated devices through a variety of aspects and features. For example, devices can be constructed to employ wireless communication and energy between components, and thus be wholly wireless. Such embodiments obviate the use of time-consuming and failure-prone wiring and soldering, resulting in more durable devices capable of being produced faster and with less expense. Further, in some embodiments, a wireless energy emitter can be used as an energy regulator by transmitting energy out of the system if a spike or surge is detected. In at least one embodiment, alternative means of energy generation can be employed to provide energy to a wireless energy transmitter component, and increase the self-sufficiency of users and devices.

In addition, some embodiments can provide for the consolidation of various wireless protocols. For example, in embodiments employing wireless communication, data can be associated with or coupled with energy provided. In one embodiment, transmitters and/or base units that transmit data and energy simultaneously from a single apparatus are employed. In one embodiment, data and energy can be coupled or associated and then transmitted. In one embodiment, data can be transmitted in such a way as to underlay energy.

Where this application refers to "wireless energy transfer," "wireless energy emission," "wireless energy transmission," "wireless energy collection," "wireless energy reception," et cetera, and similar phrases concerning electricity or other means for powering devices, a number of techniques, schemes, manners, modes or means can be employed to accomplish such energizing effect. These techniques can include, but are not limited to, induction (magnetic, resonant or non-resonant inductive coupling, capacitive coupling, et cetera), radio and microwave (using rectenna or other means), laser (optical energy), electrical conduction, and others. Inductive techniques can include circuit features such as multiple coils to enhance coupling in a variety of component orientations within the generated electromagnetic field. Various assemblies for these and other wireless power techniques that are known to one of ordinary skill in the art and can be applied to the benefit of features described herein. Further, an assortment of converters can be used to convert electricity (or other energy) into energy suitable for wireless emission or transmission, and similar or other converters can be employed to convert energy collected or received wirelessly to electricity (or other energy). The techniques described are not intended to be limiting, but rather set forth certain example standards for accomplishing some aspects and embodiments discussed in this application. In one embodiment, two or more of these techniques can be employed by a single device or component, a plurality of devices or components that share collected or received energy.

In one embodiment, passive elements can be employed to supplement operation or serve as elements to be energized or de-energized through exposure to an electric or magnetic field to perform operation using wireless power or to serve other functions (e.g., identification, authentication, switching, et cetera) in conjunction with other wireless power techniques.

While these provide particular aspects of at least one embodiment, other applications involving different features, variations or combinations of aspects will be apparent to those skilled in the art based on the following details relating to the drawings and other portions of this application.

The following paragraphs include definitions of selected terms discussed at least in the detailed description. The definitions may include examples used to explain features of terms and are not intended to be limiting. In addition, where a singular term is disclosed, it is to be appreciated that plural terms are also covered by the definitions. Conversely, where a plural term is disclosed, it is to be appreciated that a singular term is also covered by the definition.

References to "one embodiment", "an embodiment", "one example", "an example", and so on, indicate that the embodiment(s) or example(s) so described may include a particular feature. The embodiment(s) or example(s) are shown to highlight one feature and no inference should be drawn that every embodiment necessarily includes that feature. Multiple usages of the phrase "in one embodiment" and others do not necessarily refer to the same embodiment; however this term may refer to the same embodiment. It is to be appreciated that multiple examples and/or embodiments may be combined together to form another embodiment.

"Computer-readable medium", as used herein, refers to a medium that stores signals, instructions, and/or data. A computer may access a computer-readable medium and read information stored on the computer-readable medium. In one embodiment, the computer-readable medium stores instruction and the computer can perform those instructions as a method. The computer-readable medium may take forms, including, but not limited to, non-volatile media (e.g., optical disks, magnetic disks, and so on), and volatile media (e.g., semiconductor memories, dynamic memory, and so on). Example forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Component", "logic", "module", "interface" and the like as used herein, includes but is not limited to hardware, firmware, software stored or in execution on a machine, a routine, a data structure, and/or at least one combination of these (e.g., hardware and software stored). Component, logic, module, and interface may be used interchangeably. A component may be used to perform a function(s) or an action(s), and/or to cause a function or action from another component, method, and/or system. A component may include a software controlled microprocessor, a discrete logic (e.g., ASIC), an analog circuit, a digital circuit, a programmed logic device, a memory device containing instructions, a process running on a processor, a processor, an object, an executable, a thread of execution, a program, a computer and so on. A component may include one or more gates, combinations of gates, or other circuit components. Where multiple components are described, it may be possible to incorporate the multiple components into one physical component. Similarly, where a single component is described, it may be possible to distribute that single component between multiple physical components. In one embodiment, the multiple physical components are distributed among a network. By way of illustration, both/either a controller and/or an application running on a controller can be one or more components.

FIG. 1 illustrates one embodiment of a system 100 with a connector component 110 and a transmitter component 120. The connector component 110 can connect to a source (e.g., an energy source). The energy source can be a source that supplies an energy. In one embodiment, this energy source can be an electrical energy source. The electrical energy source can be an outlet, a wire or line (e.g., high voltage electrical, low voltage electrical, connection to a computer port or other device, et cetera), a converter or adapter, a battery, a power plant, a generator, multiples or combinations thereof, et cetera. The source can be fixed or change over time or according to other goals or limitations (e.g., location, movement, system downtime, time of day, time of year, energy costs, availability of alternatives, economic factors, environmental factors, cost or consumption containment at either source or receiver, et cetera), and multiple or redundant sources can be employed depending on the load, demand or situational context of a particular use (e.g., critical use requiring backups, intermittent use that can be discontinued periodically, et cetera). In one or more embodiments, the energy can be supplied to connector component 110 via wireless or contact-less energy provisioning means. The electrical source powers connector component 110, which in turns supplies energy to the transmitter component 120. The transmitter component 120 can transmit wireless energy for reception by devices enabled to benefit from wireless energy. Transmitter component 120 can utilize near-field or far-field wireless energy techniques, or combinations thereof, and others. For example, in one embodiment, the transmitter component 120 can be configured to employ both inductive coupling and infrared lasers to emit power to one or more devices.

In one embodiment, the transmitter component 120 can emit the energy to a device. In one example, the transmitter component 120 identifies a particular device (e.g., identifies a device low on power, receives an instruction that energy should be sent to a device, and others). The transmitter component 120 can evaluate the device (e.g., to determine how much energy to send to the device) and send the energy based, at least in part, on an evaluation result. In one embodiment, the energy is directly emitted to the device. However, other devices may take the energy. In one embodiment, the energy is masked (e.g., masked such that other devices do not take the energy intended for the device).

In one embodiment, the transmitter component 120 emits the energy wirelessly through two or more wireless energy transmission techniques. In one example, X % of the energy is transmitted by way of a first wireless energy transmission technique and Y % of the energy is transmitted by way of a second wireless energy transmission technique. In one embodiment, the transmitter component 120 analyzes various factors (e.g., weather conditions, past technique performance, and others) and an analysis result is used to select at least one of the two or more wireless energy techniques. In one embodiment, a first wireless energy technique is used. Performance of the first wireless energy technique is evaluated and if performance is below a certain threshold, then a second wireless energy technique is selected and employed (e.g., concurrent with the first wireless energy technique, stopping the first wireless energy technique, and others).

In one embodiment, the transmitter component 120 emits data wirelessly concurrently with wireless emission of the energy. In one embodiment, the transmitter component 120 identifies data designated for a device upon which wireless energy is to be directed. Identified data is transmitted concurrently with the wireless energy. In one embodiment, wireless energy is transmitted to a device. During transmission, the device is evaluated to determine if data should also be sent with the wireless energy. If a positive determination results, then data can be selected and transmitted concurrently.

In one embodiment, the connector component 110 is configured to physically separate from the transmitter component. The connector component 110 can be configured to engage a second transmitter component that is substantially similar to the transmitter component 120. The transmitter component 120 can be configured to engage a second connector component that is substantially similar to the connector component 110.

Figure 2:
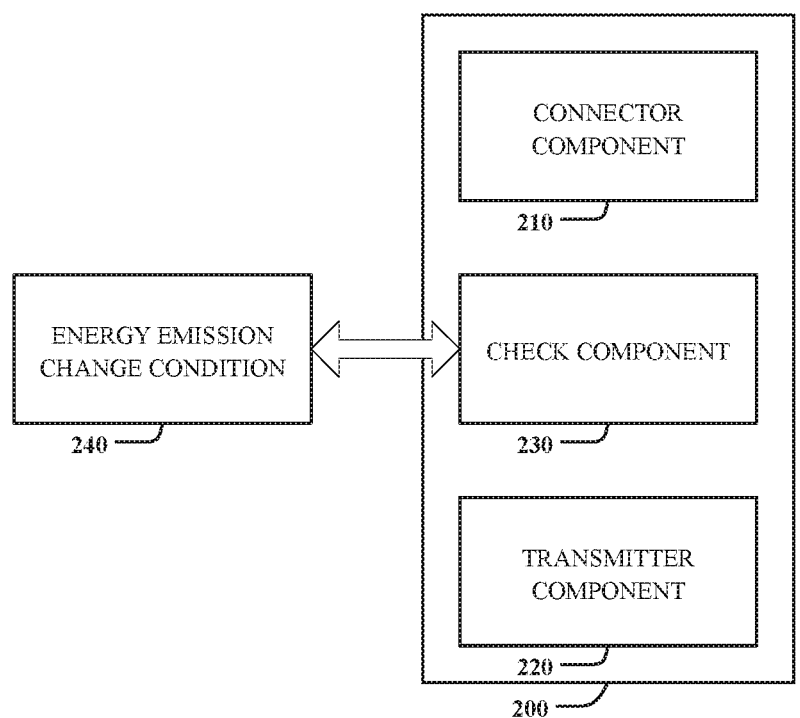

FIG. 2 illustrates one embodiment of a system 200 with a connector component 210, a transmitter component 220, and a check component 230. Connector component 210 is configured to receive energy from an energy source or supply. Transmitter component 220 can use energy supplied via connector component 210 to emit or broadcast energy wirelessly. Check component 230 manages connector component 210 and transmitter component 220 by at least evaluating, determining or viewing an energy emission change condition 240. In one embodiment, the check component 230 determines if an energy emission condition (e.g., energy emission change condition) is met. In one example, the transmitter component 220 can change emission of the energy in response to the energy emission condition being met. Energy emission change condition 240 can be a rule, constraint, contextual characteristic, or other variable that relates to the system state or other external circumstances. For example, in one embodiment, the energy emission change condition 240 can be a source energy threshold (e.g., battery level, consistency of supply connection, et cetera). In another embodiment, energy emission change condition 240 can be a rule or constraint such as a priority of use or uses, load measurement, source-to-load comparison, et cetera. Depending on the state of energy emission change condition 240, check component 220 can stop connector component 210 from drawing from the energy supply, or stop transmitter component 220 from transmitting energy wirelessly. In other embodiments, check component can limit or regulate power to or from connector component 210 or transmitter 210. In at least one embodiment utilizing a plurality of wireless energy transmission techniques, check component 230 can enable or disable a particular technique. Similarly, in at least one embodiment where connector component 210 draws from multiple sources and/or where transmitter component 220 transmits energy wirelessly to multiple loads, check component 230 can enable or disable particular sources, or allow or disallow power to particular loads (e.g., couple/decouple, beam/stop beaming, emit/cease emission et cetera).

In one embodiment, the transmitter component 220 can stop emission in response to the energy emission condition (e.g., energy emission change condition 240) being met. In one example, the energy emission change condition 240 can be to change wireless energy transmission if a battery level of a device reaches a 90% charge. If the batter level of the device reaches the 90% charge, then the energy emission change condition is met. Based on the energy emission change condition being met, the transmitter component 220 can stop emission, emit less energy, emit more energy, and others.

In one embodiment, the transmitter component 220 can start emission in response to the energy emission condition being met. In one example, when a device changes from a 'sleep' state to an 'on' state, the transmitter component 220 can emit energy to the device. Thus, the energy emission condition can be the device changing to the 'on' state, the device changing from the 'sleep' state to the 'on' state, and others.

Figure 3:
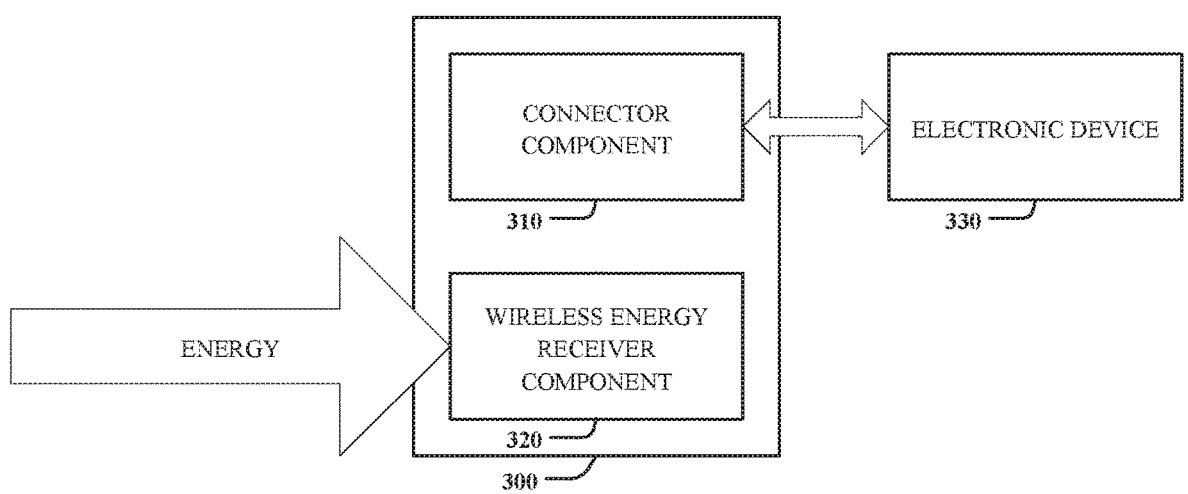

FIG. 3 illustrates one embodiment of a system 300 with a connector component 310 and a wireless energy receiver component 320. The wireless energy receiver component 320 can receive energy via one or more wireless energy transmission techniques. Wireless energy receiver component 320 supplies energy to connector component 310 that connects to device 330 in order to provide power to electronic device 330. In some embodiments, wireless energy receiver component 320, connector component 310 and electronic device 330 are a single, physically connected device. In other embodiments, one or more of wireless energy receiver component 320, connector component 310 and electronic device 330 are separate components, and can be physically connected or disconnected (e.g., one or more components serves as an adaptor for another component, components are configured to interact wirelessly, et cetera).

The connector component 310 can engage with the electronic device 330. The wireless energy receiver component 320 can collect an energy wirelessly and supplies the energy to the electronic device 330 by way of the connector component 310.

Figure 4:
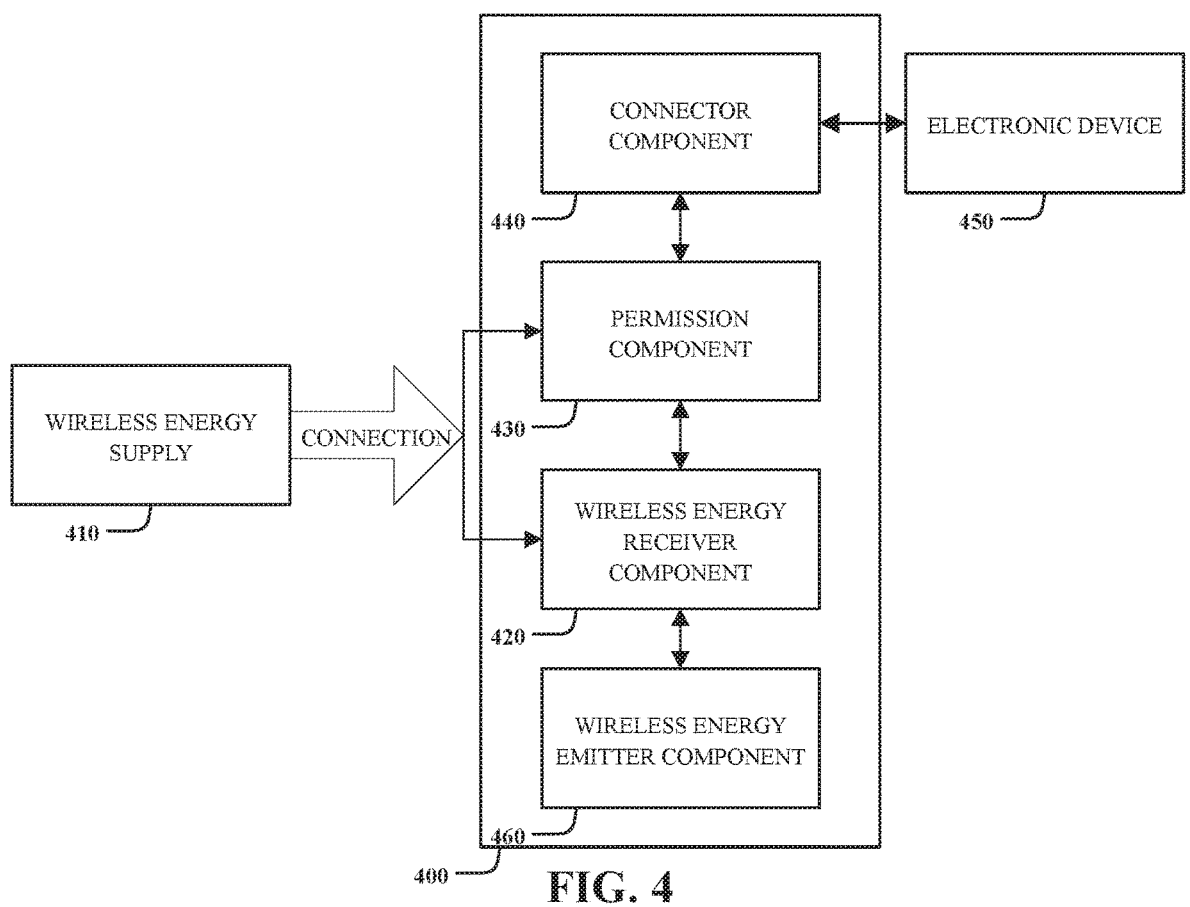

FIG. 4 illustrates one embodiment of a system 400 where wireless energy receiver component 420 receives power wirelessly through a connection (e.g., coupling, radio wave reception, microwave reception, laser or other energy beam, et cetera) with wireless energy supply 410. The connection can be facilitated by a connector component 440. In some embodiments, wireless energy supply 410 is connected (via the same or other means, including wired or wireless data transmission means) to a permission component 430. The permission component 430 can manage a connection between the wireless energy receiver component 420 and the wireless energy supply 410. The permission component 430 can determine the permission(s) of other components in system 400 and/or elsewhere to participate in the utilization of wireless energy. Permission component 430 can determine a permission that can start, stop, or regulate other components.

In one example, permission component 430 can cause wireless energy power supply 410 to terminate the power connection with wireless energy receiver component 420. The permission component 430 can disable wireless energy receiver component 420 and/or cause wireless energy receiver component 420 to terminate its connection with wireless energy supply 410. Permission component 430 also block connector component 440 from receiving energy from wireless energy receiver component 420, thus blocking device 450 from receiving such energy. In one embodiment, permission component 430 can enable such connections or energy transfers. In one embodiment, permission component 430 selectively manages connections involving energy going between components. In one example, in an embodiment where wireless energy supply 410 is in fact a plurality of wireless energy supplies, permission component 430 can selectively connect or disconnect one or more thereof. Permission component 430 can evaluate permissions based on a multiplicity of procedures, including user prompts for permission information, automatic permission information, electronic handshake, identification of a source, receiver or device, and others. Passive components (e.g., passive transponders, Radio-frequency identification tags, et cetera) can be employed to identify or provide information pertinent to permissions. Various wired and wireless methods of data exchange can be employed to permit transfer of energy between components. A handshake can take place during a distinct exchange of data, underlay data, and/or energy already being transferred.

The connector component 440 can be an electrical socket entity (e.g., socket, plug, male end, female end, and others). The system 400 includes a wireless energy emitter component 460 that can be configured to cause the energy to emit wirelessly (e.g., to emit the energy wirelessly). In one embodiment, the wireless energy emitter component 460 emits an energy that is collected by one or more devices. In one embodiment, the wireless energy emitter component 460 causes the energy to emit wirelessly from a source to a destination, where the source and destination are part of a device (e.g., the electronic device).

Figure 5:
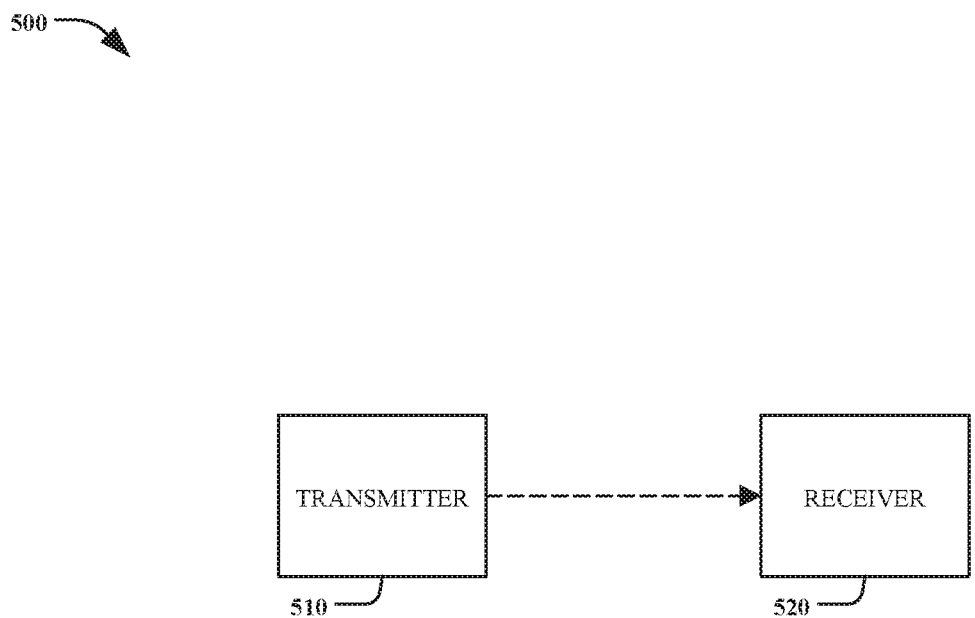

FIG. 5 illustrates one embodiment of a system 500 with transmitter 510 and receiver 520. Transmitter 510 can transmit energy at a distance for reception by receiver 520. Transmitter 510 can convert or generate energy capable of wireless transmission, and then transmit such energy to receiver 520. Receiver 520 can directly employ the received energy, or convert the received energy to another form (e.g., electricity) before using such energy or supplying such energy to another component or device. Receiver 520 can receive one type of energy wirelessly, or a plurality of energy types. For example, receiver 520 can have both secondary coils for induction and a rectenna to receive for microwave energy.

Figure 6:
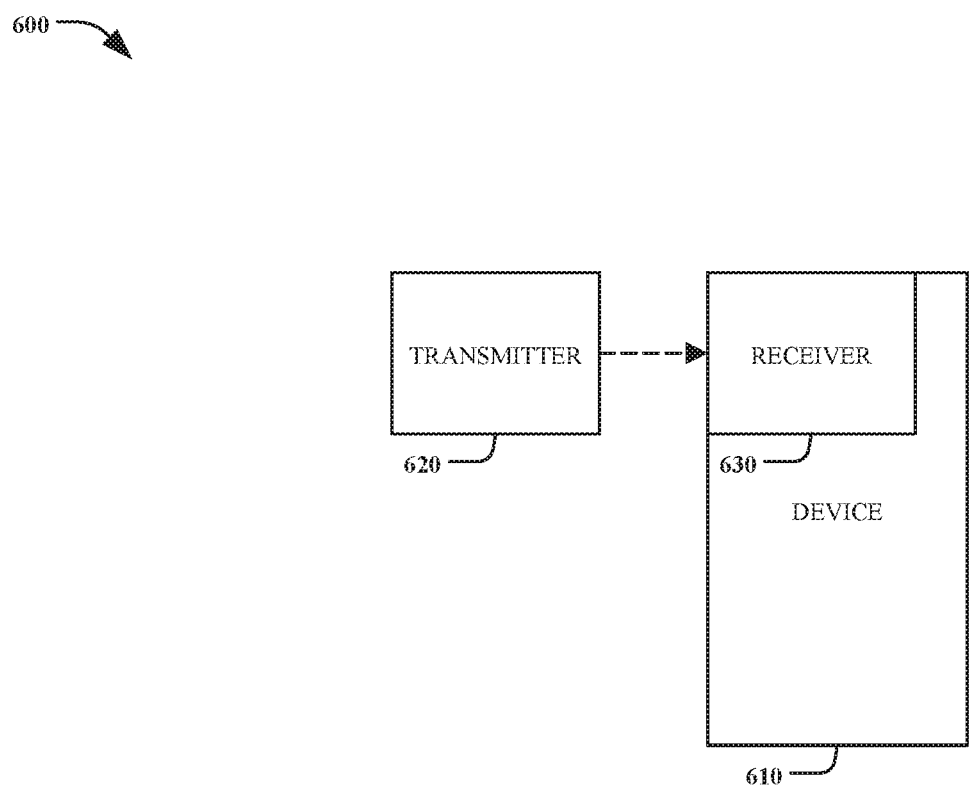

FIG. 6 illustrates one embodiment of a system 600 with a device 610 including a receiver 630. Receiver 630 receives power wirelessly from transmitter 620. Receiver 630 can be permanently connected to or embedded in device 610. Alternatively, receiver 630 can be a peripheral component, or standalone component capable of receiving power independent from device 610. Example devices include cellular telephones, laptop computers music players, and others.

Figure 7:
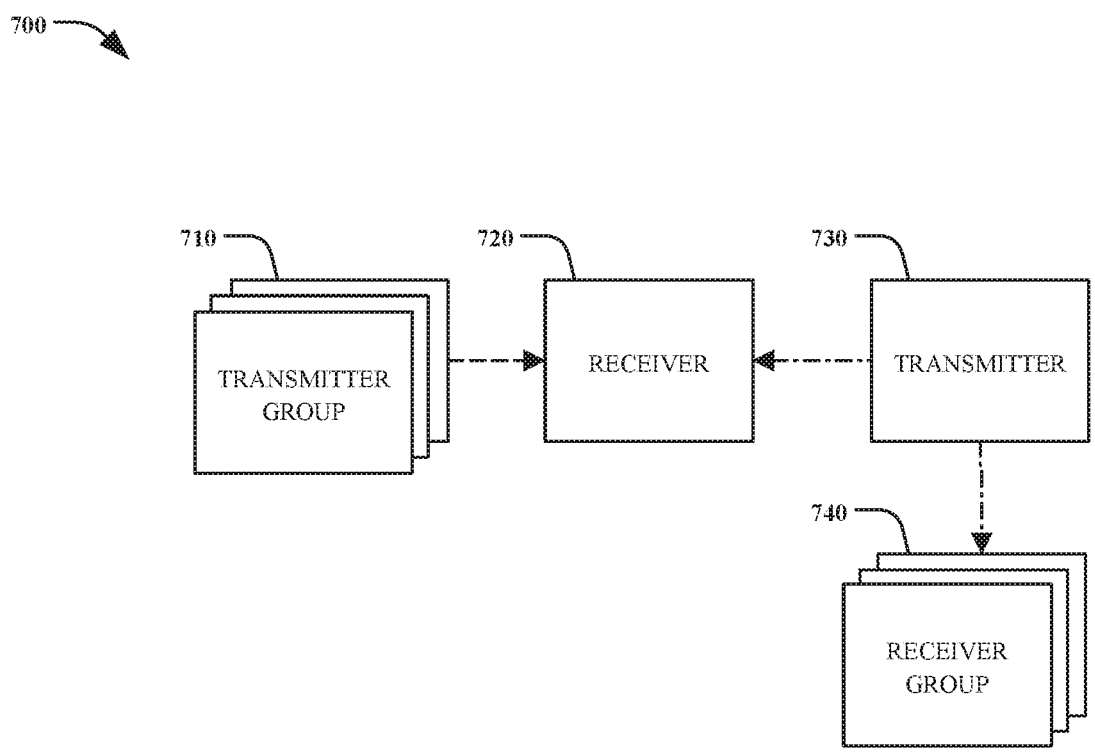

FIG. 7 illustrates one embodiment of a system 700 with a plurality of transmitters and receivers transmitting and receiving power wirelessly. Transmitter group 710 can include a plurality of transmitters. The transmitters of transmitter group 710 may operate using the same (or necessarily different) wireless power techniques. The plurality of wireless power transmitters in transmitter group 710 transfer power wirelessly to receiver 720. Thus, a single receiver (receiver 720) can receive power from a plurality of wireless power transmitters. Receiver 720 can also receive power from transmitter 730. Further, transmitter 730 provides wireless energy to receiver group 740 that can include a plurality of receivers. Thus, a single transmitter can provide energy wirelessly for a plurality of receivers in receiver group 740.

Figure 8:
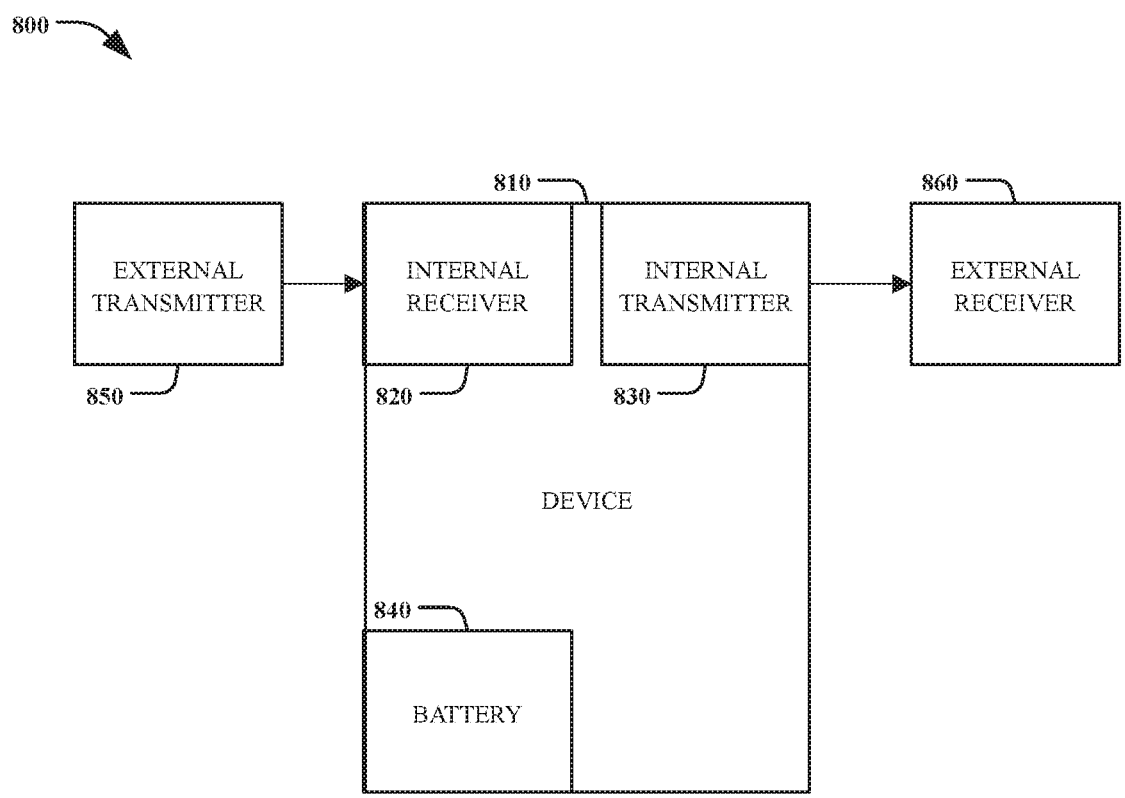

FIG. 8 illustrates one embodiment of a system 800 with a device 810 including internal receiver 820, internal transmitter 830, and battery 840. Internal receiver 820 can receiver energy wirelessly from external transmitter 850. The energy received by internal receiver 820 can go to powering device 810 or its components, or be used to charge battery 840. Internal transmitter 830 can transmit energy to external receiver 860 via one or more wireless energy transfer techniques. Internal receiver 820 and internal transmitter 830 can be combined into a single transceiver component, or exist and/or function as two independent components. Device 810 can act as a relay between external transmitter 850 and external receiver 860 (e.g., to improve efficiency, to overcome distance, to overcome interference, to establish line-of-sight, et cetera). Device 810 can store or utilize a portion of the energy received from external transmitter 850, or pass received energy on to external receiver 860. In at least one embodiment, external receiver 860 can receive energy directly from external transmitter 850 distinctly from or in conjunction with power from internal transmitter 830. In one embodiment, external transmitter 850 can cease to transmit energy wirelessly, but internal transmitter 830 can continue to supply energy to external receiver 860 by utilizing stored energy in battery 840 or from other sources (e.g., wired connection, other storage, et cetera).

Figure 9:
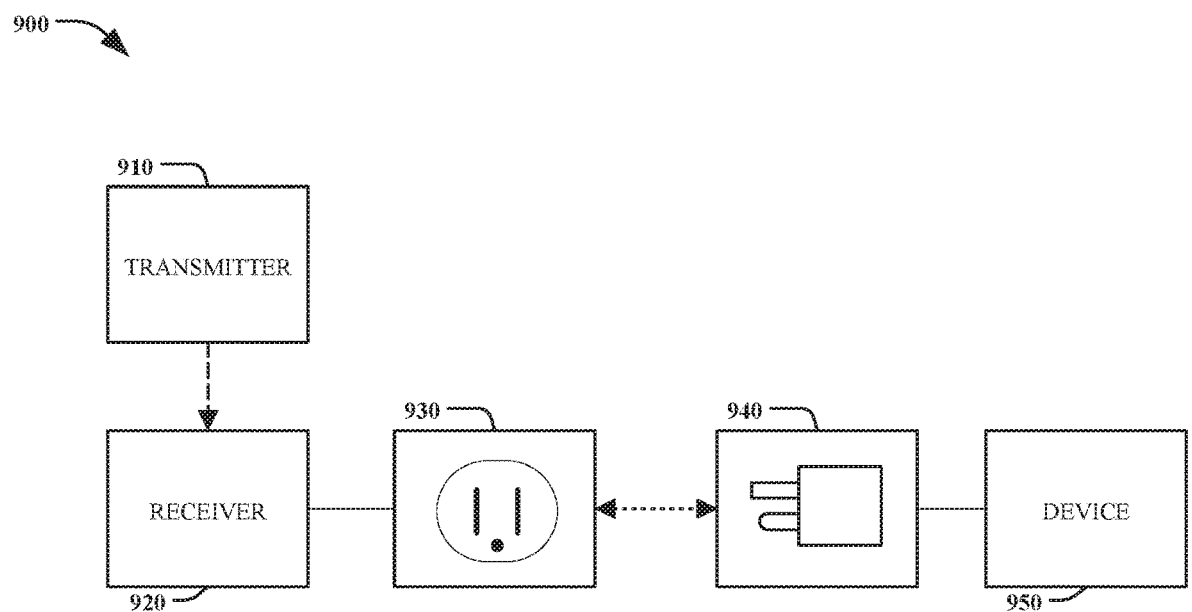

FIG. 9 illustrates one embodiment of a system 900 where receiver 920 receives energy wirelessly to power outlet 930. Outlet 930 can be an electrical (or other device-powering) receptacle, socket or outlet according to common standards or proprietary connection designs. In one embodiment, outlet 930 can be a simple connection between two wires. In one embodiment, outlet 930 can be a plurality of identical or differing receptacles that provide energy (e.g., electricity) to connected devices. Transmitter 910 emits energy wirelessly for collection by receiver 920. Receiver 920 can convert (if necessary) energy from transmitter 910, which is provided to loads connected to outlet 930. In an embodiment, outlet 930 functions as an electrical outlet as if outlet 930 were wired in a building. In one embodiment, outlet 930 can employ permission or authentication means to confirm the permission of a plugged device to receive power (e.g., passive component actuation, exchange of data, user prompt, et cetera). Plug 940 is plugged into outlet 930 to receive energy as if the plug 940 of device 950 was plugged into a hard-wired outlet. In this way, devices inoperable with wireless energy and lacking appropriate adaptors can still receive energy in a wireless energy architecture.

Figure 10:
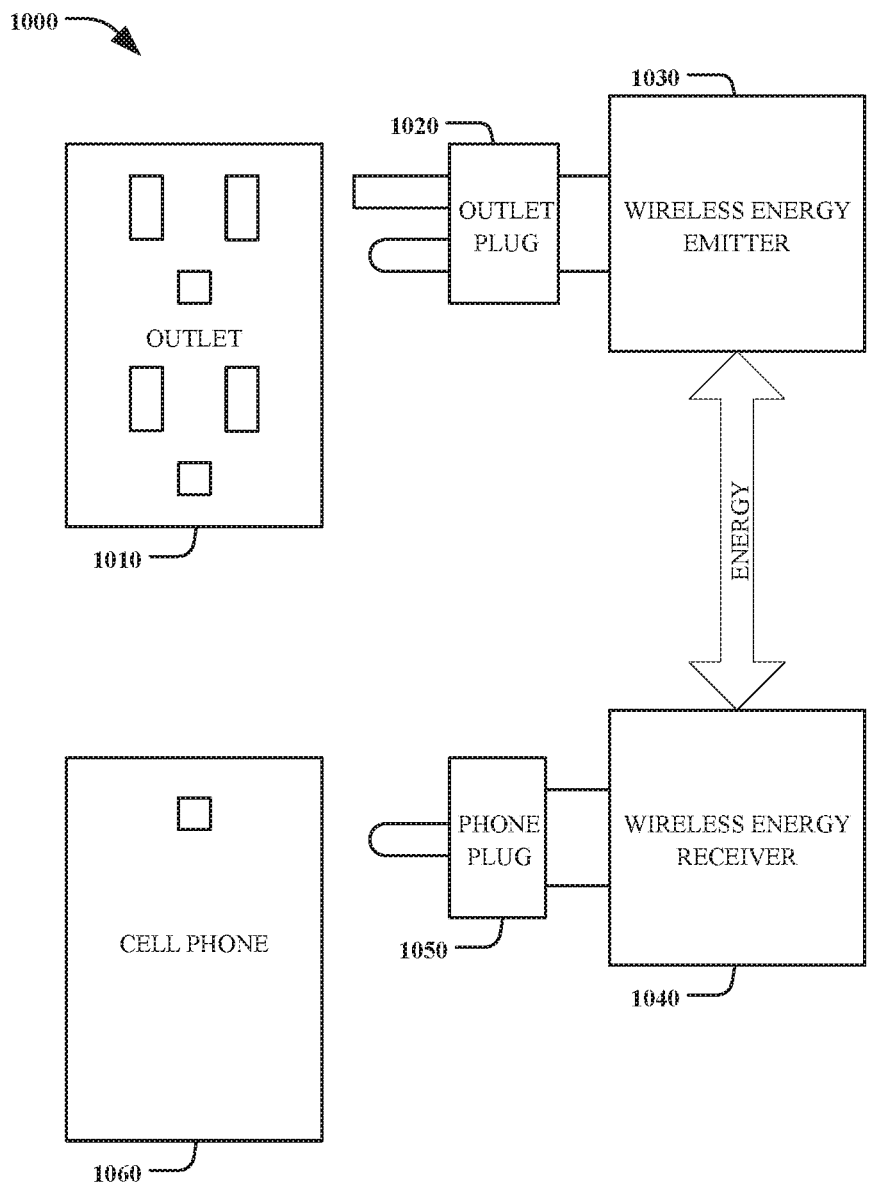

FIG. 10 illustrates one embodiment of a system 1000 with a wireless energy receiver adapted to connect to electronic device (e.g., cell phone 1060, music player, portable television, personal digital assistant, video player, router, printer, and others). Outlet plug 1020 is connected to outlet 1010 to provide electricity to wireless energy emitter 1030. Wireless energy emitter 1030 uses the energy supplied through outlet 1010 (or other energy from storage or other connections/sources) to emit energy wirelessly for collection by an appropriate receiver. Wireless energy receiver 1040 receives at least a portion of the energy emitted by wireless energy emitter 1030, which is transferred to cell phone 1060 via phone plug 1050. Outlet plug 1020 and phone plug 1050 can be plugs compatible with a particular socket-type, or can match a design to connect at one or more locations to a specific device. While the embodiment illustrated in FIG. 10 directs itself toward the re-charging of the cell phone 1060 (e.g., cellular telephone, smart phone, and others), it is readily appreciable that the combination of wireless energy receiver 1040 and phone plug 1050 can be applied to other devices and contexts. In one example, wireless energy receiver 1040 can be configured with a plug to connect to a household appliance to enable the household appliance to operate at least in part using wireless energy. In another example, an aftermarket Global Positioning System, music player, or hands-free device used in a car can receive wireless electricity in a similar fashion, with wireless electricity provided by the car or a plug that interfaces with a car power source (e.g., 12-volt "lighter" automobile socket). In one embodiment, the wireless energy emitter 1030 is part of a mat and the cell phone 1060 can lie on the mat. A wireless physical contact (e.g., physically touching) can form between the wireless energy emitter 1030 and the wireless energy receiver 1040 and wireless energy can transfer along the contact.

Figure 11A:
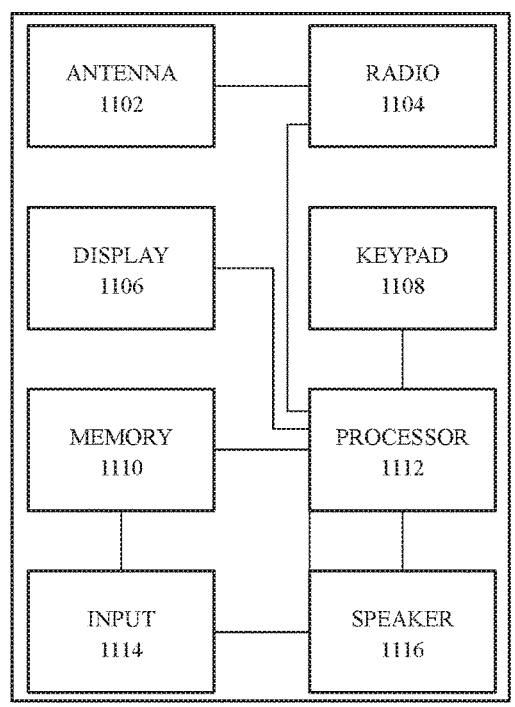

FIG. 11A illustrates one embodiment of a system 1100 constructed using wired connections between components including antenna 1102, radio 1104, display 1106, keypad 1108, memory 1110, processor 1112, input 1114 and speaker 1116. These components are wired together using various wires, solder, cables, buses, ports, et cetera. These components can be labor-intensive to assemble, and prone to manufacturing defect or failure due to accidental damage or everyday use.

Figure 11B:
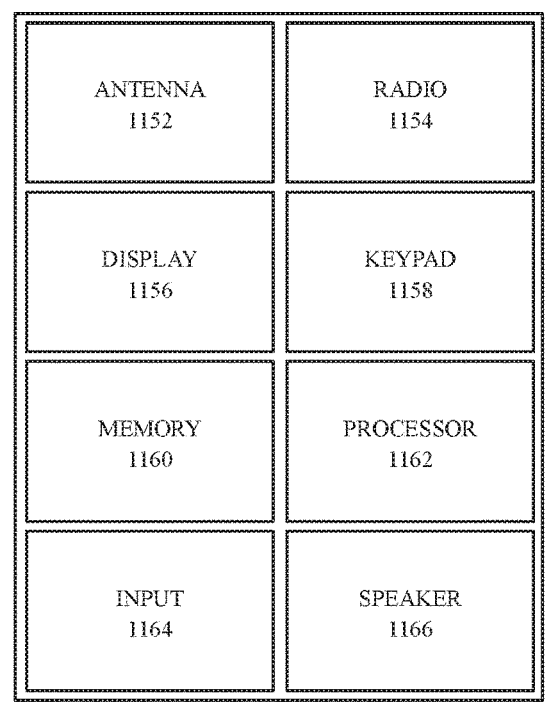

FIG. 11B illustrates one embodiment of a system 1150 constructed without the use of wired connections between antenna 1152, radio 1154, display 1156, keypad 1158, memory 1160, processor 1162, input 1164 and speaker 1166. In one embodiment, other entities (e.g., e.g., a battery, a communication port, and others) can have wireless connections within system 1150. Employing one or more wireless data transfer techniques and/or one or more wireless energy transfer techniques, all of the components of system 1150 can interact and function in concert without the need for physical connections. The components can include wireless power transmitters, receivers and/or transceivers, as well as wireless data transmitters, receivers and/or transceivers to provide the full function of system 1100 without the drawbacks of a system dependent on continuous physical connection. While the embodiment of FIG. 11B is framed in context of handheld device, can be extended to other interdependent components or systems to reduce the limitations inherent to hard-wired connections. For example, a local area network, a lighting array, or a room containing multiple pieces of equipment can exchange data and power according to wireless techniques to reduce the need for clutter and failure resulting from physical disconnection. In one embodiment, the system 1150 can include the wireless energy emitter component 460 of FIG. 4 (e.g., and other components disclosed herein) that can cause the energy to emit wirelessly from a source to a destination within a device (e.g., system 1150).

It is to be appreciated that one device can include wired and non-wired connections. In one example, a connection for transmitting data between a user interface and a first storage is wired while a connection for transmitting data between the user interface and a second store is wireless. In addition, a connection can include wired and wireless features. In one example, wireless transmission of energy and/or data can be used. If wireless transmission fails, then wired transmission can be used as a backup.

In embodiments, a method utilizing system 1150 comprises initiating collection of wireless energy using an induction technique at a memory component of a cellular phone using a memory energy receiver within the memory component to produce a first collected energy, initiating collection of wireless energy using the induction technique at a processor component of the cellular phone using a processor energy receiver within the processor component to produce a second collected energy, powering operation of the memory component of the cellular phone by the at least the first collected energy, powering operation of the processor component of the cellular phone by the at least the second collected energy, wirelessly transmitting a data stored on the memory component to the processor component using a memory data transmitter within the memory component, wirelessly receiving the data at the processor component using a processor data receiver within the processor component, and processing the data at the processor component. The memory component and the processor component are within a housing of the cellular phone, and the memory energy receiver and the processor energy receiver are physically separate components.

In some embodiments such as the above, the first collected energy and the second collected energy is collected from at least two sources, and the two sources are physically apart. The method of claim 13, further comprising initiating emission from a wireless energy transmitter within the housing of the cellular phone for collection of wireless energy at one or more of the processor component and the memory component, and initiation of the emission occurs, at least in part, based on a determination if a logical rule is met.

In some embodiments such as the above, the method can comprise, initiating collection of wireless energy using the induction technique at an input component of the cellular phone using an input energy receiver within the input component to produce a third collected energy and powering operation of the input component of the cellular phone by the at least the third collected energy. The input component is within the housing of the cellular phone, and the input component is configured to receive input from a user of the cellular phone.

In some embodiments such as the above, the logical rule checks one of a battery level, a priority of use, a load measurement, and a comparison of source energy to load energy. In some embodiments such as the above, the logical rule determines that sufficient energy is available to complete operation of the memory component and operation of the processor component.

In some embodiments such as the above, the method further comprises producing a transformed data through processing the data with the processor component and transmitting the transformed data wirelessly to the memory component for storage using a processor data transmitter within the processor component.

In some embodiments such as the above, the method comprises wirelessly transmitting input information associated with the input to one of the processor component and the memory component. In some embodiments such as the above, the first collected energy and the second collected energy are collected from the same wireless energy emission. In some embodiments such as the above, the first collected energy and the second collected energy are collected at separate times.

Embodiments of system 1150 can comprise a handheld electronic device including a housing, a memory component housed by the housing, a non-transitory computer readable medium of the memory component configured to maintain stored information, a first wireless energy receiver of the memory component configured to receive a first wireless energy using an induction technique, the first wireless energy powers operation of the memory component, a first wireless data transceiver of the memory component configured to send and receive the stored information, a processor component housed by the housing, a processor of the processing component configured to process at least a portion of the stored information, a second wireless energy receiver of the processing component configured to receive a second wireless energy using the induction technique, the second wireless energy powers operation of the processor component, and a second wireless data transceiver of the processing component configured to send and receive at least a portion of the stored information or portions thereof transformed by processing. The memory component and the processor component interact using the first wireless data transceiver and the second wireless data transceiver.

Embodiments of a system above can comprise at least one wireless energy transmitter component that emits energy wirelessly to at least one of the first wireless energy receiver or the second wireless energy receiver. The wireless energy transmitter component can be housed by the housing.

Embodiments of a system above can comprise a battery accepting component coupled with at least one of the at least one wireless energy transmitter component. The emitted wireless energy can be, at least in part, supplied from a battery engaged with the battery accepting component.

Embodiments of a system above can comprise, the at least one wireless energy transmitter component receives a wired energy from an external energy source external to the housing supplied through an electrical plug coupled with an electrical outlet and in electrical communication with the handheld electronic device, and the wired energy is used by the wireless energy transmitter component to emit the at least one of the first wireless energy or the second wireless energy.

Embodiments of the system above can comprise an input component housed by the housing of the handheld electronic device, a third wireless energy receiver of the input component configured to receive a third wireless energy using the induction technique, the third wireless energy powers operation of the input component, and a third wireless data transceiver of the input component configured to send and receive input information.

In embodiments, a system 1150 can comprise a non-transitory computer-readable medium storing computer-executable instructions that when executed by a computer cause the computer to perform a method. The method comprises collecting of wireless energy at a memory component of a cellular phone using a memory energy receiver that is part of the memory component to produce a first collected energy, the memory energy receiver employing an induction technique, collecting of wireless energy at a processor component of the cellular phone using a processor energy receiver that is part of the processor component to produce a second collected energy, the processor energy receiver employing an induction technique, powering operation of the memory component of the cellular phone by at least the first collected energy, and powering operation of the processor component of the cellular phone by at least the second collected energy, wirelessly transmitting a digital data stored on the memory component to the processor component using a memory data transmitter within the memory component. The memory component and the processor component are not in direct physical contact or wired physical contact, wirelessly receiving the digital data at the processor component using a processor data receiver within the processor component, and processing the digital data at the processor component while the processor component is powered by at least the second collected energy. The memory component and the processor component are within a single housing of the cellular phone, and the memory energy receiver and the processor energy receiver are physically separate components.

For an embodiment of a system such as the above, the executed method can further comprise collecting of wireless energy at an input component of the cellular phone using an input energy receiver that is part of the input component to produce a third collected energy, the input energy receiver employing an induction technique, and powering operation of the input component of the cellular phone by at least the third collected energy.

For an embodiment of a system such as the above, the executed method can further comprise causing transmission of the wireless energy collected by the memory component from an energy source that is part of the cellular phone, and causing transmission of the wireless energy collected by the processor component from the energy source that is part of the cellular phone.

In embodiments, a system like 1150 can be used to perform a method comprising powering operation of a memory component of a device using a first wirelessly collected energy, powering operation of a processor component of the device by a second wirelessly collected energy, and communicating data wirelessly between the memory component and the processor component. The memory component and the processor component are in a housing of the device, and the device does not include a wired processor.

An embodiment of a method such as that described above can further comprise powering operation of an input component using a third wirelessly collected energy. The input component is mechanically coupled with the housing, and the input component is one of a keyboard, pointer, or touch screen.

An embodiment of a method such as that described above can further comprise receiving an input from the input component. An embodiment of a method such as that described above can further comprise wirelessly transmitting input information associated with the input to one of the processor component or the memory component.

An embodiment of a method such as that described above can further comprise initiating emission from a wireless energy transmitter within the housing of the device for powering one or more of the processor component and the memory component.

In an embodiment of a method such as that described above initiation of the emission occurs, at least in part, based on a determination if a logical rule is met, and the logical rule determines that sufficient energy is available to complete operation of the memory component and operation of the processor component. The logical rule determining that sufficient energy is available can, in some embodiments, include determining an amount of energy required to complete a next process, and comparing the amount of energy required to complete the next process to available power.

An embodiment of a method such as that described above can further comprise producing a transformed data through processing the data with the processor component. An embodiment of a method such as that described above can further comprise transmitting the transformed data wirelessly to the memory component for storage using a processor data transmitter within the processor component.

An embodiment of a method such as that described above, the first wirelessly collected energy and the second wirelessly collected energy are collected from the same wireless energy emission. An embodiment of a method such as that described above, the first wirelessly collected energy and the second wirelessly collected energy are collected at separate times.

An embodiment of a system such as system 1150 can comprise a handheld electronic device including a housing and a memory housed by the housing. The memory is configured to receive wireless energy that powers the memory, and the memory is configured to send and receive wireless data. The system can further comprise a processor housed by the housing. The processor is configured to receive wireless energy that powers the processor. The processor is also configured to send and receive wireless data, the memory and the processor interact by sending and receiving wireless data, and the handheld electronic device does not include a wired processor.

In an embodiment of a system such as the above, the system further comprising a wireless energy transmitter housed by the housing. The wireless energy transmitter is configured to emit energy wirelessly to at least one of the memory or the processor.

In an embodiment of a system such as the above, the system further comprising a power source coupled with the wireless energy transmitter, and emitted wireless energy is supplied from the power source.

In an embodiment of a system such as the above, the power source is a battery. In an embodiment of a system such as the above, the power source is a power cord configured to connect to an electrical outlet.

In an embodiment of a system such as the above, the system further comprises an input component housed by the housing of the handheld electronic device, the input component is configured to receive wireless energy that powers the processor, and the input component is configured to send and receive wireless data, and the input component is one of a keyboard, pointer, or touch screen.

In an embodiment of a system 1150 can comprise a non-transitory computer-readable medium storing computer-executable instructions that when executed by a computer cause the computer to perform a method. The method can comprise powering operation of a memory component of a device using a first wirelessly collected energy, powering operation of a processor component of the device by a second wirelessly collected energy, and communicating data wirelessly between the memory component and the processor component. The memory component and the processor component are in a housing of the device, and the device does not include a wired processor.

Embodiments of a system such as the above executing a method can have the method comprise powering operation of an input component using a third wirelessly collected energy. The input component is mechanically coupled with the housing, and the input component is a touch screen. Embodiments of a system such as the above executing a method can have the method comprise receiving an input from the input component.

Turning to FIGS. 11C and 11D, illustrated are embodiments of devices configured without the use of wiring and physical connections between internal components having fluid-resistant enclosures. FIG. 11C shows device 1150', similar to device 1150, but including fluid enclosures 1168 and 1170 enclosing memory 1160 and processor 1162, respectively. FIGS. 11C and 11D show two possible variants, but as can be appreciated from these variants, any number of fluid enclosures, enclosing any number of device components, can be utilized without departing from the scope or spirit of the innovation.

The fluid-resistant enclosures can, but need not be, airtight or hermetically sealed. One or more components can be in such enclosure, casing, seal, et cetera, and a device can have any number of enclosures or seals. In embodiments, particular components can be provided their own seal or multiple seals to provide for enhanced survivability or recovery prospects. For example, a device may have a fluid-resistant enclosure around a group of computer components, but have a separate or extra fluid-resistant enclosure around a wholly wireless memory component to increase the likelihood that data can be recovered if the other enclosure is compromised. In this regard, components can be discussed as "shielded from fluids," "shielded from an environment," "sealed from an environment," et cetera to describe circumstances in which they might be enclosed by one or more enclosures that are independent from or shared with enclosures enclosing other components. As used herein, "fluid resistant" can mean a material that is semi-permeable or breathable but generally resists the flow of fluids unless immersed, an impermeable material that prevents the flow of liquids, an impermeable material that is airtight, or others.

In embodiments, an enclosure is made of or includes a damping material. The damping material may provide vibration or shock resistance to provide alternative or additional protection to components of an electronic device. Damping material may be provided around one or more components (e.g., single portion of damping material around one component, two components, more components) and provided on one or more sides or from one or more angles (e.g., may be provided in a way that does not impact the thickness of a device).

In embodiments, one or more of devices 1150, 1150', and/or 1150" (or other embodiments within the scope of the disclosure) may be flexible. By being substantially or wholly wireless, the device avoids the need for traditional circuit boards or other rigid structures and allows for different shapes, sizes, and flexibility.

In embodiments, one or more of devices 1150, 1150', and/or 1150" (or other embodiments within the scope of the disclosure) may include one or more wired connections, but use certain computing components that are fully wireless, thereby hybridizing devices with both wired and wireless computing components.

In embodiments, a housing can include a seal separate from the seal around any component therein.

Seals or enclosures herein can be fluidly or gaseously sealed against an external environment to prevent fluid, gas, or other media from passing through the seal. In embodiments, a fluid or gas can be included within the seal. For example, a fluid coolant can be included within a seal. In embodiments, a gaseous coolant can be included within the seal. In embodiments, gas and/or fluid can be removed, and a vacuum can be provided within a seal. In embodiments, different seals can contain different fluid or gaseous media. In embodiments, a first fluid or gaseous media can be included in a sealed housing, but excluded from the seals about components therein. In embodiments, different media from that in the housing body can be within the seals about components within the housing (e.g., first gas or fluid in a sealed housing, second gas or fluid about components sealed therein, third or fourth gases or fluids about different components sealed therein, et cetera).

Figure 12:
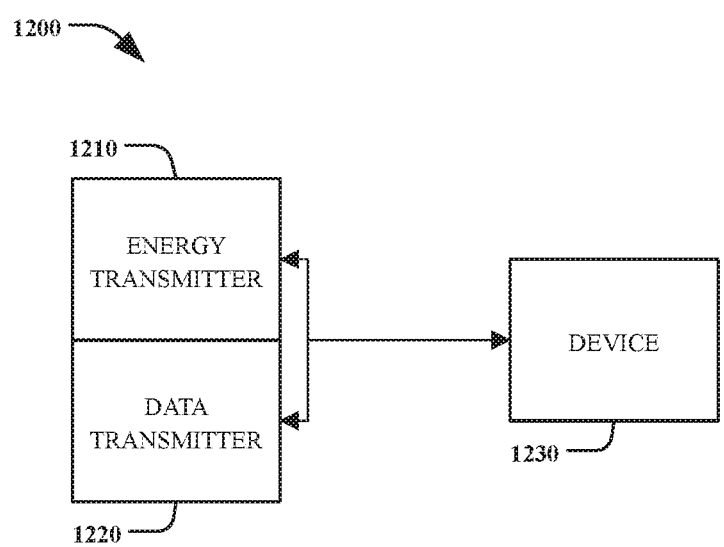

FIG. 12 illustrates one embodiment of a system 1200 with energy transmitter 1210 and data transmitter 1220. Energy transmitter 1210 and data transmitter 1220 transmit energy and data wirelessly for the operation of device 1230. Device 1230 can evaluate the data to determine the following operations to be performed with the data (or other actions occurring thereafter) and receive energy to provide power if necessary. In one embodiment, energy transmitter 1210 or data transmitter 1220 can perform this determination. In one embodiment, device 1230 can request energy to be transmitted when necessary for operation (in view of the data or other activity) after receiving data. In another embodiment, device 1230 receives energy first (or energy transmitter 1210 transfers energy first) in preparation for data to be transmitted or anticipated activity. In one embodiment, or energy transmitter 1210 transfers energy prior to transmission of data by data transmitter 1220 in preparation for data to be transmitted or anticipated activity. In one embodiment, data can underlay the energy to be discovered by device 1230 (e.g., frequency, power and other metrics or changes thereof). In one embodiment, security, authentication, or permissions can be employed to protect wireless energy or data from being utilized by an unauthorized party or device.

The following methodologies are described with reference to figures depicting the methodologies as a series of blocks. These methodologies may be referred to as methods, processes, and others. While shown as a series of blocks, it is to be appreciated that the blocks can occur in different orders and/or concurrently with other blocks. Additionally, blocks may not be required to perform a methodology. For example, if an example methodology shows blocks 1, 2, 3, and 4, it may be possible for the methodology to function with blocks 1-2-4, 1-2, 3-1-4, 2, 1-2-3-4, and others. Blocks may be wholly omitted, re-ordered, repeated or appear in combinations not depicted. Individual blocks or groups of blocks may additionally be combined or separated into multiple components. Furthermore, additional and/or alternative methodologies can employ additional, not illustrated blocks, or supplemental blocks not pictured can be employed in some models or diagrams without deviating from the spirit of the features. In addition, at least a portion of the methodologies described herein may be practiced on a computer-readable medium storing computer-executable instructions that when executed by a computer cause the computer to perform a methodology.

Figure 13:
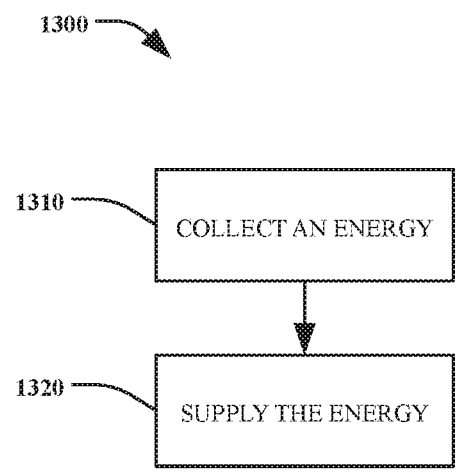

FIG. 13 illustrates one embodiment of a method 1300 for causing the powering of components using wireless electricity. At 1310, electricity can be collected wirelessly. Thus, at 1310, there can be collecting an energy that is transmitted wirelessly to produce a collected energy (e.g., an energy that is transmitted wirelessly is collected). The collection can occur via one or more wireless energy transfer techniques, with energy originating at one or more wireless energy emission stations, and energy may change forms to or from electricity to supply the desired form. At 1320, electricity can be supplied to one or more components at least in part from the energy collected wirelessly at 1310. Thus, at 1320, there can be supplying the collected energy to a device.

In one embodiment, supplying the energy to the device includes transmitting the energy wirelessly to the device. In one embodiment, the energy is collected from at least two sources. In one example, the sources are different types (e.g., a first source by a first manufacturer and a second source by a second manufacturer, a first source using a first wireless energy transmission technique and a second source using a second wireless energy transmission technique, and others).

Figure 14:
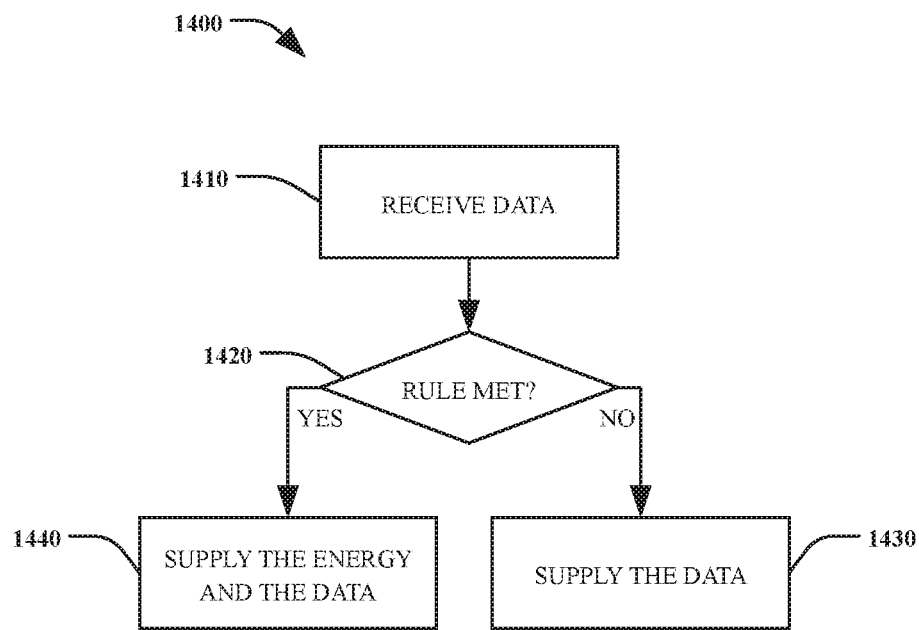

FIG. 14 illustrates one embodiment of a method 1400 for causing management of wireless power and data in conjunction. At 1410, data is received. At 1420, a rule is evaluated in view of the data. The rule can relate to, for example, a battery level, a credential check, a compatibility check, a load measurement, and/or the nature of the data being transferred. In a more specific example, a battery level could be evaluated to discern whether further power is needed to receive, process, or manipulate the sent data or data to be sent. In another example, credentials can be checked to verify whether a device is permitted to access the data or wireless energy. Another example rule could be a determination of compatibility between the device and the wireless power technique(s) in use as well as compatibility between the device and the data being sent. In still another example, the nature of the data being transferred can be assessed to infer likely actions to follow, whether the data is appropriate or relevant, how long the data may take to send, et cetera. If the rule fails at 1420, the data is supplied without wireless energy at 1430. However, if the rule is satisfied, wireless energy can be supplied before, after, or concurrently with the data at 1440. It is readily appreciable that in some embodiments, variations of the method illustrated in FIG. 14 can be realized through various wireless energy management plans, such as supplying energy before data, refusing data, and energy if a rule fails, and so forth.

Figure 15:
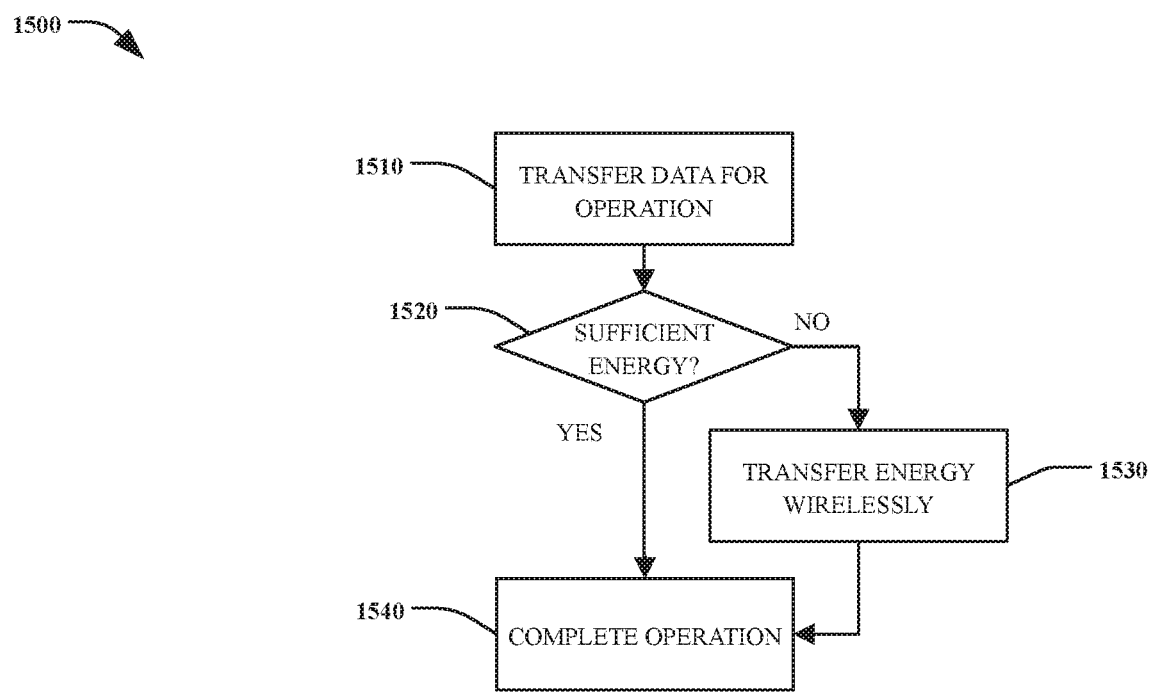

FIG. 15 illustrates one embodiment of a method 1500 for causing assurance of sufficient energy to perform a processing task in conjunction with data. At 1510, data is transferred for a processing operation. At 1520, a determination is resolved as to whether sufficient energy is available to complete goals associated with the processing task. For example, data transfer time, task intensity, processor scheduling, operator characteristics and history, task priority, potential conflicts, available power sources, battery level et cetera can be considered to determine whether additional energy is required to fulfill the data's intended purpose (or other goals). If sufficient energy is not available, energy is transferred wirelessly at 1530. Energy transmission at 1530 can be for immediate use, for charging of a battery, or some combination thereof. If sufficient energy is available at 1520, or after sufficient energy is provided at 1530, the operation can be completed at 1540.

Figure 16:
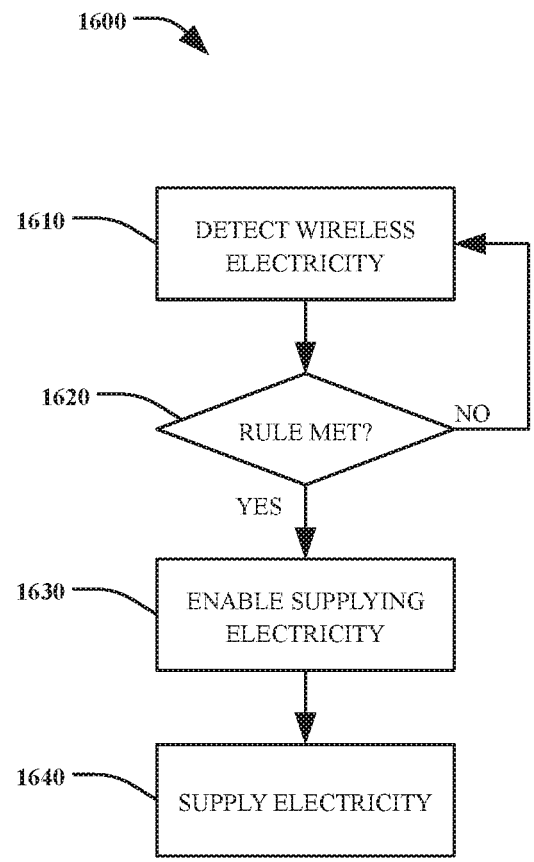

FIG. 16 illustrates one embodiment of a method 1600 for causing enforcement of rules in a wireless energy architecture. At 1610, one or more wireless electricity sources are detected. Thereafter, at 1620, a rule is tested to determine whether wireless electricity can be accessed from the detected source(s). The rule can relate to authentication, the amount and/or stability of alternative electric sources, the importance of one or more electricity uses, a location, a time, a cost, a number of other devices or traffic on a wireless electricity system, a load, et cetera. If the rule is complied with, the supplying of wireless electricity can be enabled at 1630, and electricity can be supplied to the component(s) and/or device(s) at 1640.

Figure 17:
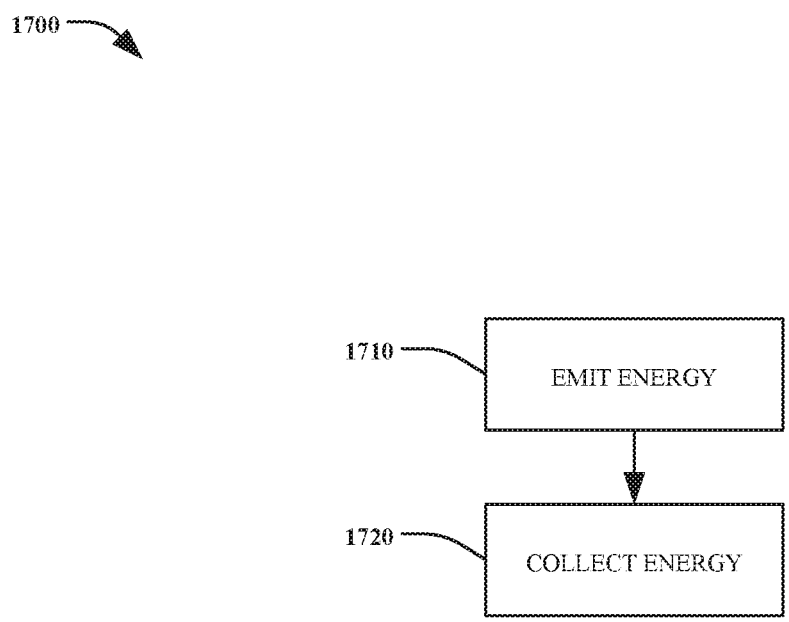

FIG. 17 illustrates one embodiment of a method 1700 for causing collection of wireless energy. At 1710, wireless energy is emitted. In some embodiments, energy can be received from a source and converted into another form prior to emission. At 1720, wireless energy is collected. In some embodiments, the wireless energy can be consumed, and in other embodiments the collected wireless energy can be stored or used to charge a battery. Wireless energy can be emitted at 1710 and collected at 1720 at one or more points, using one or more techniques of wireless energy transfer, at once or over a period of time, and continuously or intermittently.

Figure 18:
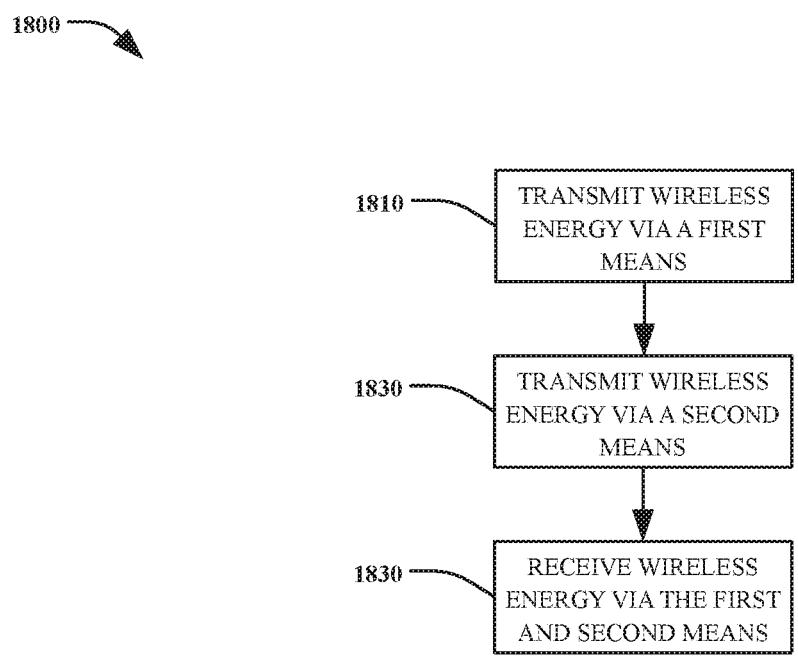

FIG. 18 illustrates one embodiment of a method 1800 for causing reception of wireless energy via two or more means. At 1810, energy is wirelessly transmitted by a first means (e.g., non-resonant induction, laser, et cetera). At 1820, a potentially but not necessarily different wireless energy technique (e.g., microwave, resonant induction, et cetera) is used to transmit energy wirelessly via a second means. At 1830, the energy is received according to both means. A broad spectrum of wireless energy techniques can then be utilized. One or more forms of energy can be converted if necessary to render the energy useful for the intended purpose at 1830.

Figure 19:
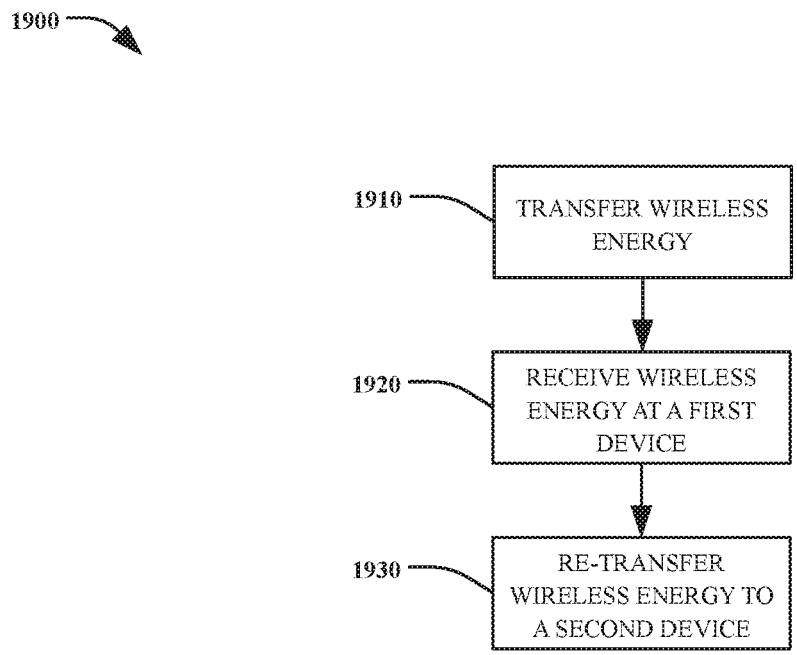

FIG. 19 illustrates one embodiment of a method 1900 for causing the relay of energy without wires. At 1910, wireless energy is transferred. Wireless energy transfer can be according to one or a diversity of wireless energy transmission techniques, and can employ one or more transmitters or sources. At 1920, the wireless energy is received at a first device. The first device then transfers at least a portion of the received wireless energy to a second device at 1930. In this way, the first device acts as a relay or repeater to extend the range of the wireless energy sources, and can also mitigate other difficulties such as interference or line-of-sight requirements.

Figure 20:
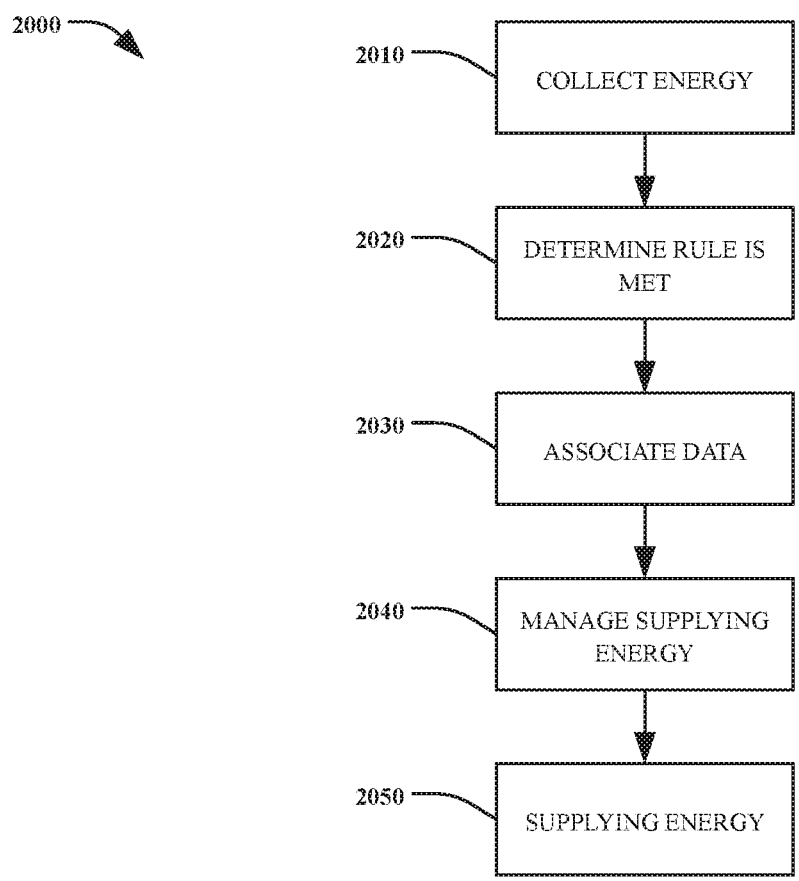

FIG. 20 illustrates one embodiment of a method 2000 for supplying energy to a device. At 2010, an energy is collected that is transmitted wirelessly to produce a collected energy. A device can transmit a wireless energy and this wireless energy can be received. In one embodiment, the collected energy is collected from at least two sources. At 2020, a determination is made on if a rule is met. In one example, a rule can be that a device running the method 2000 should be at 90% power before transmission occurs. If the device is at less than 90% power, then the collected energy is used to power the device.

At 2030, a data is associated with the collected energy. In one embodiment, data is selected and selected data is associated with the collected energy. In one embodiment, data selection can be based on a logical association the data has with the collected energy. In an example, the collected energy can be intended to power a battery used to support a volatile memory. Thus, data can be selected for association that is to be retained in the volatile memory (e.g., it may be logical to send the energy and data to one area). In one embodiment, data selection can be based on a physical association the data has with the collected energy. In an example, if transmitting the collected energy consumes a relatively large amount of device resources, then smaller data portions can be selected (e.g., where transmitting smaller data portions consume fewer device resources than larger data portions). In one embodiment, contextual circumstances can be taken into consideration with selecting data. In an example, if a wireless energy transfer occurs and a relatively high number of errors are experienced, then a low-importance data can be selected for association since the low-importance data may have a relatively high likelihood of experiencing an error.

At 2040 collected energy supply is managed and at 2050, the collected energy is supplied (e.g., as a wireless power cloud, to a device, and others). In one embodiment, managing supplying of the collected energy can be in response to the rule being met. In one embodiment, managing supplying of the collected energy based at least in part on the data. In one embodiment, less energy or no energy can be wirelessly transmitted to devices playing games or watching videos. In an embodiment, devices transferring data related to preferred processes (e.g., processes that are critical, high-value, related to a plurality of devices and/or approved) can receive energy wirelessly first, and devices operating non-preferred uses can receive energy after preferred uses are satisfactorily supplied. Other means of emitting energy based on the data will be readily apparent to those skilled in the art, and these examples are in no way exhaustive or comprehensive. In one embodiment, the collected energy is supplied along with the data after associating the data (at 2030). In one embodiment, supplying the collected energy to the device includes transmitting the energy wirelessly to the device (e.g., directly to a device, directly to a specific receiver of the device, directly with security features (e.g., password protection), and others). In one embodiment, the device is a first device while there is supplying the collected energy to at least a second device concurrently with supplying the collected energy to the first device. Supplying can be directed to the first and second device, made available to devices (e.g., the first device and the second device) within an area, and others.

Figure 21:
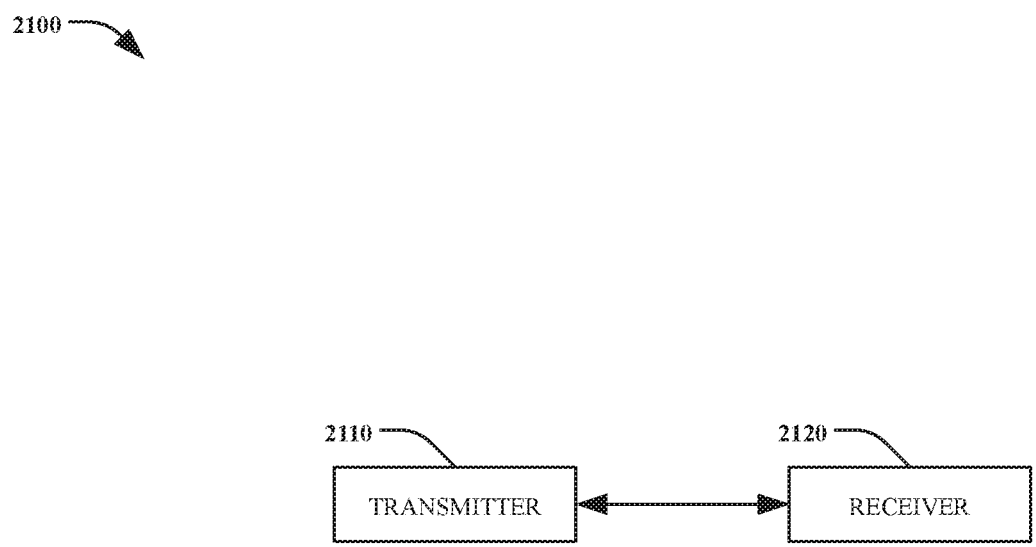

FIG. 21 illustrates one embodiment of a system 2100 that may be used in practicing at least one aspect disclosed herein. The system 2100 includes a transmitter 2110 and a receiver 2120. In one or more embodiments, the transmitter 2110 can include reception capabilities and/or the receiver 2120 can include transmission capabilities. The transmitter 2110 and receiver 2120 can each function as a client, a server, and others. The transmitter 2110 and receiver 2120 can each include a computer-readable medium used in operation. The computer-readable medium may include instructions that are executed by the transmitter 2110 or receiver 2120 to cause the transmitter 2110 or receiver to perform a method. The transmitter 2110 and receiver 2120 can engage in a communication with one another. This communication can over a communication medium. Example communication mediums include an intranet, an extranet, the Internet, a secured communication channel, an unsecure communication channel, radio airwaves, a hardwired channel, a wireless channel, and others. Example transmitters 2110 include a base station, a personal computer, a cellular telephone, a personal digital assistant, and others. Example receivers 2120 include a base station, a cellular telephone, personal computer, personal digital assistant, and others. The example network system 2100 may function along a Local Access Network (LAN), Wide Area Network (WAN), and others. The aspects described are merely an example of network structures and intended to generally describe, rather than limit, network and/or remote applications of features described herein.

Figure 22:
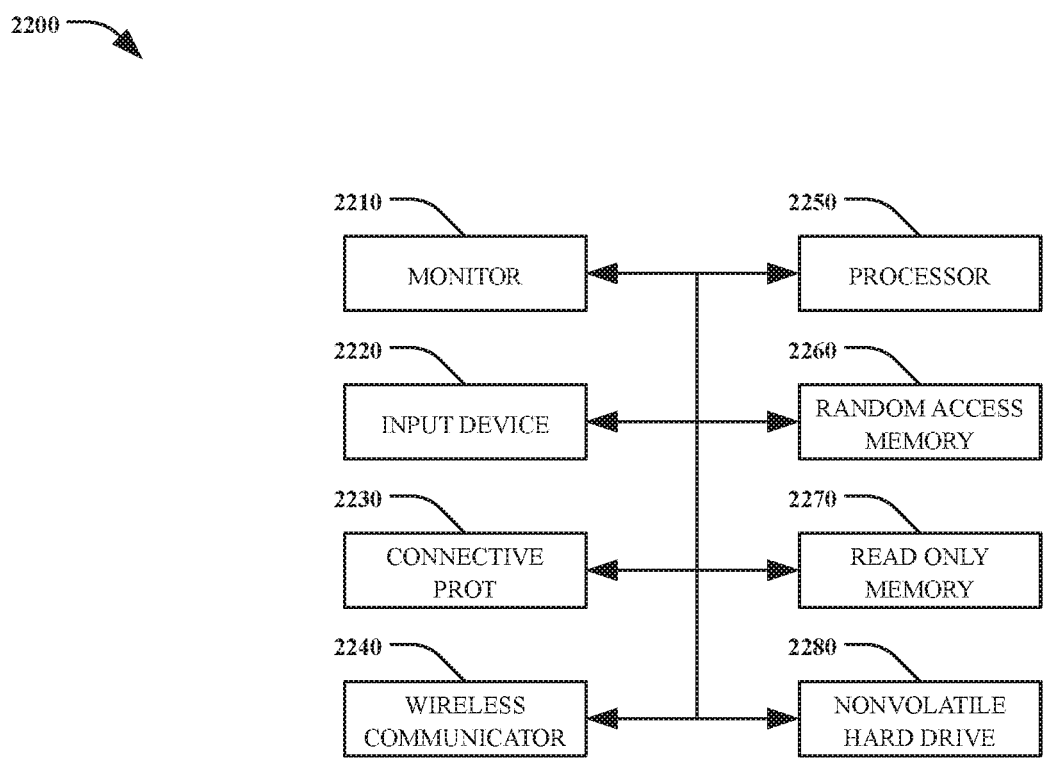

FIG. 22 illustrates one embodiment of a system 2200, upon which at least one aspect disclosed herein can be practiced. In one embodiment, the system 2200 can be considered a computer system that can function in a stand-alone manner as well as communicate with other devices (e.g., a central server, communicate with devices through data network (e.g., Internet) communication, etc.). Information can be displayed through use of a monitor 2210 and a user can provide information through an input device 2220 (e.g., keyboard, mouse, touch screen, etc.). In one embodiment, the monitor 2210 is used to display the video entertainment communication. A connective port 2230 can be used to engage the system 2200 with other entities, such as a universal bus port, telephone line, attachment for external hard drive, and the like. Additionally, a wireless communicator 2240 can be employed (e.g., that uses an antenna) to wirelessly engage the system 2200 with another device (e.g., in a secure manner with encryption, over open airwaves, and others). A processor 2250 can be used to execute applications and instructions that relate to the system 2200. Storage can be used by the system 2200. The storage can be a form of a computer-readable medium. Example storage includes random access memory 2260, read only memory 2270, or nonvolatile hard drive 2280.

The system 2200 may run program modules. Program modules can include routines, programs, components, data structures, logic, etc., that perform particular tasks or implement particular abstract data types. The system 2200 can function as a single-processor or multiprocessor computer system, minicomputer, mainframe computer, laptop computer, desktop computer, hand-held computing devices, microprocessor-based or programmable consumer electronics, and the like.

It is to be appreciated that aspects disclosed herein can be practiced through use of artificial intelligence techniques. In one example, a determination or inference described herein can, in one embodiment, be made through use of a Bayesian model, Markov model, statistical projection, neural networks, classifiers (e.g., linear, non-linear, etc.), using provers to analyze logical relationships, rule-based systems, or other technique.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, innovative aspects are not limited to the specific details, the representative apparatus, and illustrative examples shown and described. Thus, this application is intended to embrace alterations, modifications, and variations that fall within the scope of the appended claims.

Functionality described as being performed by one entity (e.g., component, hardware item, and others) may be performed by other entities, and individual aspects can be performed by a plurality of entities simultaneously or otherwise. For example, functionality may be described as being performed by a processor. One skilled in the art will appreciate that this functionality can be performed by different processor types (e.g., a single-core processor, quad-core processor, etc.), different processor quantities (e.g., one processor, two processors, etc.), a processor with other entities (e.g., a processor and storage), a non-processor entity (e.g., mechanical device), and others.

In addition, unless otherwise stated, functionality described as a system may function as part of a method, an apparatus, a method executed by a computer-readable medium, and other embodiments may be implemented in other embodiments. In one example, functionality included in a system may also be part of a method, apparatus, and others.

Where possible, example items may be combined in at least some embodiments. In one example, example items include A, B, C, and others. Thus, possible combinations include A, AB, AC, ABC, AAACCCC, AB. Other combinations and permutations are considered in this way, to include a potentially endless number of items or duplicates thereof.

What is claimed is:

1. A system, comprising:
    an electronic device;
    a memory of the electronic device, wherein the memory is configured to receive wireless energy that powers the memory, wherein the memory is configured to send and receive wireless data;
    a processor of the electronic device, wherein the processor is configured to receive wireless energy that powers the processor, wherein the processor is configured to send and receive wireless data;
    a first fluid-resistant enclosure, wherein the processor is enclosed in the first fluid-resistant enclosure; and
    a second fluid-resistant enclosure, wherein the memory is enclosed in the second fluid-resistant enclosure, and
    wherein the memory and the processor interact by sending and receiving wireless data.

2. The system of claim 1, further comprising a wireless energy transmitter of the electronic device, wherein the wireless energy transmitter is configured to emit energy wirelessly to at least one of the memory or the processor.

3. The system of claim 2, further comprising a power source coupled with the wireless energy transmitter, wherein emitted wireless energy is supplied from the power source.

4. The system of claim 3, wherein the power source is a battery.

5. The system of claim 3, wherein the power source is a power cord configured to connect to a separate power source.

6. The system of claim 3, wherein at least one of the wireless energy transmitter and the power source are shielded against fluids.

7. The system of claim 1, further comprising:
    an input component of the electronic device, wherein the input component is configured to receive wireless energy that powers the processor, and wherein the input component is configured to send and receive wireless data.

8. The system of claim 1, wherein at least one of the first fluid-resistant enclosure and the second fluid-resistant enclosure is airtight.

9. The system of claim 1, wherein at least one of the first the fluid-resistant enclosure and the second fluid-resistant enclosure includes a damping material.

10. The system of claim 1, wherein the electronic device is flexible.

11. A method, comprising:
    powering operation of a memory component of a device using a first wirelessly collected energy;
    powering operation of a processor component of the device by a second wirelessly collected energy; and
    communicating data wirelessly between the memory component and the processor component,
    wherein the memory component is enclosed by a first hermetic seal of the device, and
    wherein the processor component is enclosed by a second hermetic seal of the device.

12. The method of claim 11, the method further comprising:
    powering operation of an input component using a third wirelessly collected energy,
    wherein the input component is shielded against an environment.

13. The method of claim 12, further comprising:
    receiving an input from the input component.

14. The method of claim 13, further comprising:
    wirelessly transmitting input information associated with the input to one of the processor component or the memory component.

15. The method of claim 11, further comprising:
    initiating emission from a wireless energy transmitter of the device for powering one or more of the processor component and the memory component.

16. The method of claim 11, wherein at least one of the first the hermetic seal and the second hermetic seal includes a damping material.

17. The method of claim 11, further comprising:
    producing a transformed data through processing the data with the processor component.

18. The method of claim 17, further comprising:
    transmitting the transformed data wirelessly to the memory component for storage using a processor data transmitter within the processor component.

19. The method of claim 11, wherein the device is flexible.

20. The method of claim 11, wherein at least one of the first hermetic seal and the second hermetic seal is airtight.

* * * * *